(12) United States Patent
Sato et al.

(10) Patent No.: US 11,426,870 B2
(45) Date of Patent: Aug. 30, 2022

(54) APPARATUS AND METHOD FOR CONTROLLING ROBOT

(71) Applicant: DENSO WAVE INCORPORATED, Aichi-pref. (JP)

(72) Inventors: Masanori Sato, Chita-gun (JP); Yuto Kawachi, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 72 days.

(21) Appl. No.: 16/791,501

(22) Filed: Feb. 14, 2020

(65) Prior Publication Data
US 2020/0353619 A1    Nov. 12, 2020

(30) Foreign Application Priority Data
Feb. 14, 2019    (JP) .............................. JP2019-024493

(51) Int. Cl.
*B25J 9/16*    (2006.01)
*B25J 9/06*    (2006.01)
*B25J 9/00*    (2006.01)

(52) U.S. Cl.
CPC ........... *B25J 9/1651* (2013.01); *B25J 9/0081* (2013.01); *B25J 9/06* (2013.01); *B25J 9/1664* (2013.01)

(58) Field of Classification Search
CPC . B25J 9/0081; B25J 9/06; B25J 9/1651; B25J 9/1664; G05B 19/423; G05B 2219/40354; G05B 2219/43203; G05B 2219/36432
See application file for complete search history.

(56) References Cited

U.S. PATENT DOCUMENTS

| | | | | |
|---|---|---|---|---|
| 2015/0290796 A1* | 10/2015 | Iwatake | ................. | B25J 13/085 700/258 |
| 2015/0290798 A1* | 10/2015 | Iwatake | ................. | B25J 13/085 700/257 |
| 2019/0015972 A1* | 1/2019 | Someya | ................. | B25J 13/085 |

FOREIGN PATENT DOCUMENTS

| | | | |
|---|---|---|---|
| JP | S60-233707 A | 11/1985 | |
| JP | H05-285870 A | 11/1993 | |

* cited by examiner

*Primary Examiner* — Dale Moyer
(74) *Attorney, Agent, or Firm* — Oliff PLC

(57) ABSTRACT

There is provided a robot control apparatus that controls a vertical articulated robot and is suitable for direct teaching. In the apparatus, an axis setting section sets operation axes and control axes from among the axes subjected to angle control, when performing the direct teaching of changing a position of the arm tip, while retaining a posture thereof at a target posture. The operation axes can be dominant factors when determining the position of the arm tip and are allowed to freely move according to an external force, and the control axes can be dominant factors when determining the posture of the arm tip and are controlled by an angle control section. When performing the direct teaching, the angle control section receives an input of current angles of the operation axes and the target posture to calculate command angles of the respective control axes according to inverse kinematics calculation.

14 Claims, 17 Drawing Sheets

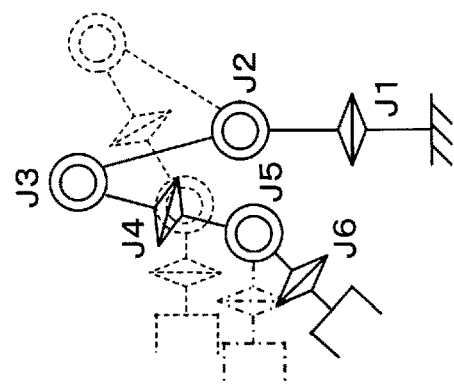
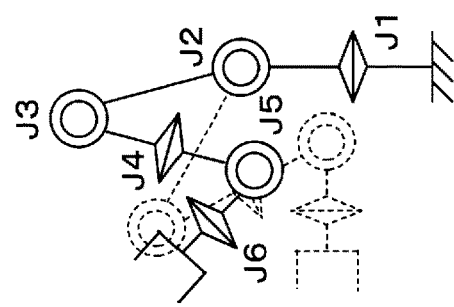
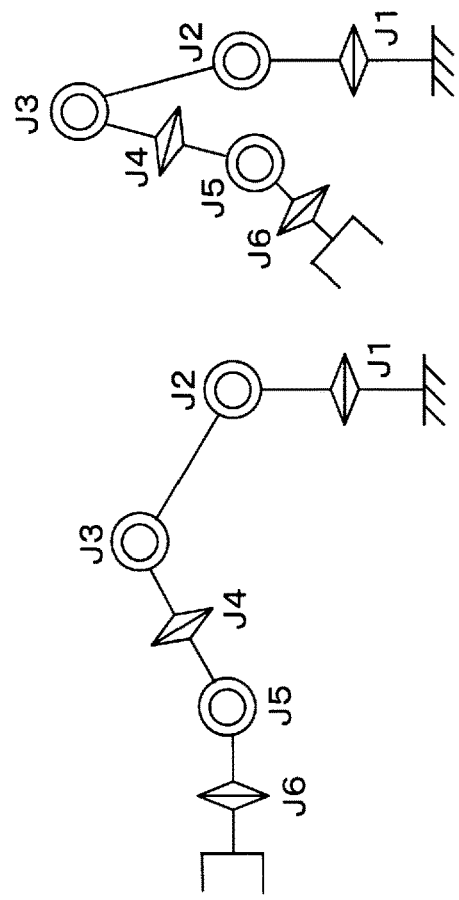
FIG.11A  FIG.11B  FIG.11C  FIG.11D

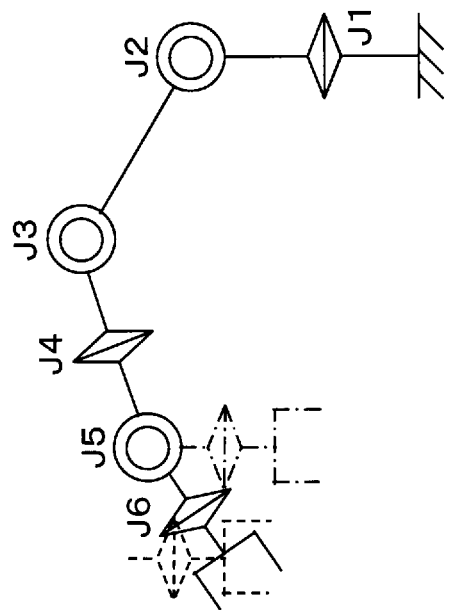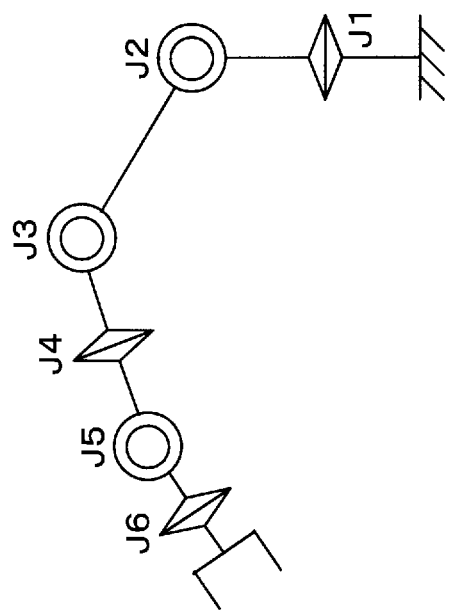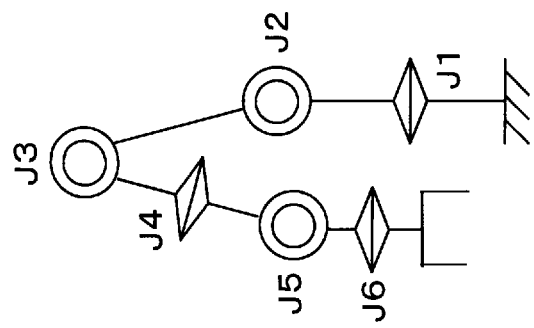

APPARATUS AND METHOD FOR CONTROLLING ROBOT

CROSS-REFERENCE TO RELATED APPLICATION

This application is based on and claims the benefit of priority from earlier Japanese Patent Application No. 2019-024493 filed Feb. 14, 2019, the description of which is incorporated herein by reference.

BACKGROUND

Technical Field

The present disclosure relates to a robot control apparatus suitable for direct teaching in which the position and posture of an arm tip of a robot, such as an industrial robot, are taught to the robot by the user directly moving the robot, and relates to a robot control method.

Related Art

As teaching methods of teaching a predetermined task to a robot, there have been used a method of remotely teaching a robot by the user using a dedicated operation terminal (hereinafter termed remote teaching), and a method of teaching a robot by the user directly holding (or touching) and moving the robot (hereinafter termed direct teaching). Direct teaching has an advantage in that the user can intuitively operate the robot without the need of expertise.

In direct teaching, however, the user is required to adjust the position and posture (or attitude) of an arm tip of the robot relying on the user's hand feel. Therefore, it has been difficult for users to change the position and posture of a robot as desired by the users, compared to remote teaching in which the position and posture are adjusted by key operation or input of numerical values.

Specifically, if a user attempts to change only the position of a tool, such as a hand, mounted to the arm tip, while keeping the posture of the tool, it has been very difficult for the user to apply a force to the robot as desired. More specifically, an extra force may be unavoidably applied to the robot, resulting in that the posture of the arm tip changes into a posture that is different from what has been desired. Similarly, if the user attempts to change only the posture of the tool while keeping the position thereof, the position of the arm tip may unavoidably change due to the difficulty of applying a force as desired.

Various techniques have been proposed to solve such issues of direct teaching. For example, as a measure against such issues, a patent document JP H05-285870 A discloses a method of controlling an arm tip of a robot. Specifically, in the control of this method, a joystick or a force sensor is mounted to the arm tip of a robot for use as an input device, and either the position or the posture of the arm tip is changed using the device. As an alternative measure, a torque sensor may be mounted to each joint of a robot for estimation of an external force based on a current value to thereby achieve a function equivalent to that of the case of mounting a force sensor.

However, such conventional art raises another issue of increasing manufacturing cost due to the addition of a sensor, or deteriorating the robot performance due to increase of weight. Furthermore, in the method of controlling force by using a force sensor or the like, the robot motion may suffer vibration depending on the posture of the robot or the way of applying a force thereto. Therefore, in the above method, vibration is required to be minimized such as by setting parameters within bounds. This may resultantly hinder intuitive operation and, accordingly, simplified teaching, which was an original object of the method, may no longer be performed.

Another patent document JP S60-233707 A discloses a method of dividing joints of a robot into two groups. Specifically, joints of one group are permitted to passively act according to the user's operation, i.e., can be operated in person, while joints of another group are subjected to angle control for retaining the position or posture of the robot by back calculation based on angle variation of the joints.

In the method disclosed in JP S60-233707 A, the current position and posture of the arm tip is ensured to be replaced (overwritten) by a posture component to be retained. Thus, when a command of greatly moving the operable joints is issued in response to such a case where the operable joints being greatly moved by the user, only the angle controllable joints are subjected to control. Therefore, the original object of retaining the posture of the arm tip may no longer be achieved. For this reason, with the method disclosed in JP S60-233707 A, it has been difficult to change the position and posture of the robot as desired by the user.

As described above, it has been very difficult to simplify adjustment of the position and posture of an arm tip of a robot in direct teaching using the conventional art including the techniques disclosed in the above patent documents JP H05-285870 A and JP S60-233707 A.

SUMMARY

It is thus desired to provide a robot control apparatus which is capable of simplifying adjustment control of the position and posture (or attitude) of an arm tip of a robot in direct teaching, and to provide a robot control method.

A robot control apparatus recited in an exemplary embodiment controls a vertical articulated robot and is suitable for direct teaching in which a user directly moves the robot to teach a position and posture (or attitude) of an arm tip of the robot. The robot control apparatus includes an angle control section that performs angle control of axes of the robot, and an axis setting section. The axis setting section sets operation axes and control axes from among the axes subjected to the angle control, when performing direct teaching changing a position of the arm tip, and while retaining a posture of the arm tip at a target posture. The operation axes are those which can be dominant factors when determining the position of the arm tip and are allowed to freely move according to an external force. The control axes are those which can be dominant factors when determining the posture of the arm tip and are controlled by the angle control section. When performing direct teaching, the angle control section receives an input of current angles of the operation axes and the target posture to calculate command angles of the respective control axes according to inverse kinematics calculation.

With this configuration, the control axes are permitted to freely move according to the user's operation (holding and moving the robot). Accordingly, the arm tip position can be changed as desired by the user. In this case, command angles of the respective control axes are ensured to be calculated based on the current angles of the operation axes that are moved according to the user's operation, and a target posture of the arm tip. Specifically, in this case, precise target values are ensured to be calculated for the respective control axes, leaving target values other than for the posture desired to be kept unknown. Thus, the arm tip posture can be retained at the target posture.

Accordingly, with the above configuration, the user can change the arm tip position while retaining the arm tip posture at a target posture, without requiring particularly difficult operation. In other words, the user can perform direct teaching while constraining the arm tip posture. Thus, the above configuration can provide an advantageous effect that adjustment control of the arm tip position and posture is simplified in direct teaching of a robot.

With the above configuration, angle control is performed such that the arm tip posture agrees with a target posture by using only the control axes, over which angle control is effective, according to the current angles of the operation axes which can be freely operated. This achieves an advantageous effect that unstable movement, such as vibration, is unlikely to occur. Furthermore, with the above configuration, direct teaching constraining the arm tip posture is ensured to be realized by using an angle control system originally provided to the robot control apparatus, without using a sensor, such as a force sensor or a torque sensor. This configuration can contribute to reducing manufacturing cost.

A robot control apparatus recited in a further exemplary embodiment controls a vertical articulated robot and is suitable for direct teaching in which a user directly moves the robot to teach a position and posture of an arm tip of the robot. The robot control apparatus includes an angle control section that performs angle control of axes of the robot, and an axis setting section. The axis setting section sets operation axes and control axes from among the axes subjected to the angle control, when performing the direct teaching of changing a posture of the arm tip, while retaining a position of the arm tip at a target position. The operation axes are those which can be dominant factors when determining the posture of the arm tip and are allowed to freely move according to an external force. The control axes are those which can be dominant factors when determining the position of the arm tip and are controlled by the angle control section. When performing direct teaching, the angle control section receives input of current angles of the operation axes and the target position to calculate command angles of the respective control axes according to inverse kinematics calculation.

With this configuration, the control axes are permitted to freely move according to the user's operation (holding and moving the robot). Accordingly, the arm tip posture can be changed as desired by the user. In this case, command angles of the respective control axes are ensured to be calculated based on the current angles of the operation axes that are moved according to the user's operation, and a target position of the arm tip. Specifically, in this case, precise target values are ensured to be calculated for the respective control axes, leaving target values other than for the position desired to be kept unknown. Thus, the arm tip position can be retained at the target position.

Accordingly, with the above configuration, the user can change the arm tip posture while retaining the arm tip position at a target position, without requiring particularly difficult operation. In other words, the user can perform direct teaching while constraining the arm tip position. Thus, the above configuration can provide an advantageous effect that adjustment control of the arm tip position and posture is simplified in direct teaching of a robot.

With the above configuration, angle control is performed such that the arm tip position agrees with a target position by using only the control axes, over which angle control is effective, according to the current angles of the operation axes which can be freely operated. This achieves an advantageous effect that unstable movement, such as vibration, is unlikely to occur. Furthermore, with the above configuration, direct teaching constraining the arm tip position is ensured to be realized by using an angle control system originally provided to the robot control apparatus, without using a sensor, such as a force sensor or a torque sensor. This configuration can contribute to reducing manufacturing cost.

In the robot control apparatus recited in the foregoing exemplary embodiments, variation in command angle of the control axes may become excessively large during direct teaching if the robot passes near a singular point or if the operation axes are abruptly operated or if the control axes are outside the respective movable ranges. In such a case, the control axes may abruptly move and safety may be deteriorated. To improve such an issue, an angle control section recited in another exemplary embodiment is ensured to perform the following process.

Specifically, the angle control section performs an acceleration correction process in which, when a command angle is calculated for each of the control axes, the command angle is corrected such that a command angular velocity and a command angular acceleration of each of the control axes calculated based on the command angle do not respectively exceed a predetermined maximum angular velocity and a predetermined maximum angular acceleration. Thus, a safe command angle is produced, which allows the angular velocity and the angular acceleration of the control axis to be respectively equal to or less than the maximum angular velocity and the maximum angular acceleration.

Thus, if the robot passes near a singular point or if variation in command angle of each of the control axes becomes excessively large by sudden operation of the control axes, the angle of the control axis is permitted to accurately reach the initially calculated command angle, while allowing the angular velocity and the angular acceleration of the control axis to be respectively equal to or less than the maximum angular velocity and the maximum angular acceleration, i.e., while the control axis is safely accelerated.

When such an acceleration correction process is performed, the motion of the control axes may be delayed from the motion of the operation axes that are operated by the user. However, such a delay is not a problem during direct teaching of the robot. This is because, in direct teaching of a robot in general, the user may hold and move the robot and then the robot is stopped, and in this state, the user may confirm whether the arm tip position and posture are as desired by the user. This series of actions is iterated to perform teaching as desired. Specifically, in direct teaching of the robot, the user does not have to continue moving the robot, and there is necessarily a period in which the robot is stopped.

In the control described above, the motion of the control axes may be delayed from the motion of the operation axes. However, the delay can be recovered during the period in which the robot is stopped. Accordingly, in direct teaching of the robot, the delay in motion of the control axes due to the control described above is not a problem. For the reasons described above, the above configuration uses, on purpose, the control of allowing motion of the control axes to be delayed. Thus, safety is ensured to be improved in the robot.

According to the robot control apparatus recited in the above exemplary embodiment, an abrupt motion of the control axes can be avoided. However, a phenomenon in which axis displacement increases near a singular point of the robot cannot be avoided. In other words, a phenomenon in which each axis moves at a joint angle that is greatly different from the command angle is unavoidable near a singular point. During direct teaching, the user operates the operation axes at a position near the robot. Therefore, in the occurrence of a phenomenon in which axis displacement increases near a singular point, the arm or the like of the robot may touch the user, which may deteriorate safety.

To improve such an issue, an angle control section recited in another exemplary embodiment is ensured to perform the following process. Specifically, the angle control section performs a singular point detection process for detecting whether the robot is positioned near a singular point. Being positioned near a singular point can be detected, for example, at each axis angle where the Jacobian becomes zero, or from the fifth axis being near zero degrees, or the like. If being positioned near a singular point is detected in the singular point detection process, the angle control section performs a command angle replacement process in which the command angles from this time onward are respectively replaced by the command angles of the previous iteration.

Thus, the above configuration additionally includes a process in which command angles are fixed (locked) to the command angles of the previous iteration when the robot is positioned near a singular point. This may minimize the occurrence of a phenomenon in which axis displacement increases near a singular point of the robot, and accordingly safety is improved. In this case, retainment in position and posture of the control axes by angle control is temporarily interrupted. However, if the control axes can clear the singular point according to the operation of the operation axes, retainment in position and posture of the control axes by angle control is resumed thereafter.

As described above, when the robot is positioned near a singular point, the process of locking the command angles to the previous command angles is executed to temporarily interrupt retainment in position and posture of the control axes by angle control. Thus, delay in motion of the control axes due to the acceleration correction process recited in the foreordering exemplary embodiment can be recovered. Specifically, with the above configuration, delay in motion of the control axes due to the acceleration correction process can be recovered, while safety of the robot at the position near a singular point can be improved.

The robot control method recited in further exemplary embodiments is based on a technical idea common to the robot control apparatus recited in the foregoing exemplary embodiments. Accordingly, the robot control method can also achieve advantageous effects similar to those of the robot control apparatus.

BRIEF DESCRIPTION OF THE DRAWINGS

In the accompanying drawings:

FIGS. 11A to 11D are schematic diagrams each illustrating a behavior of a robot when operation axes thereof have been greatly moved, according to a comparative example;

FIGS. 12A to 12C are schematic diagrams each illustrating a behavior of a robot when operation axes thereof have been greatly moved, according to a comparative example;

DETAILED DESCRIPTION OF THE PREFERRED EMBODIMENTS

Figure 1:
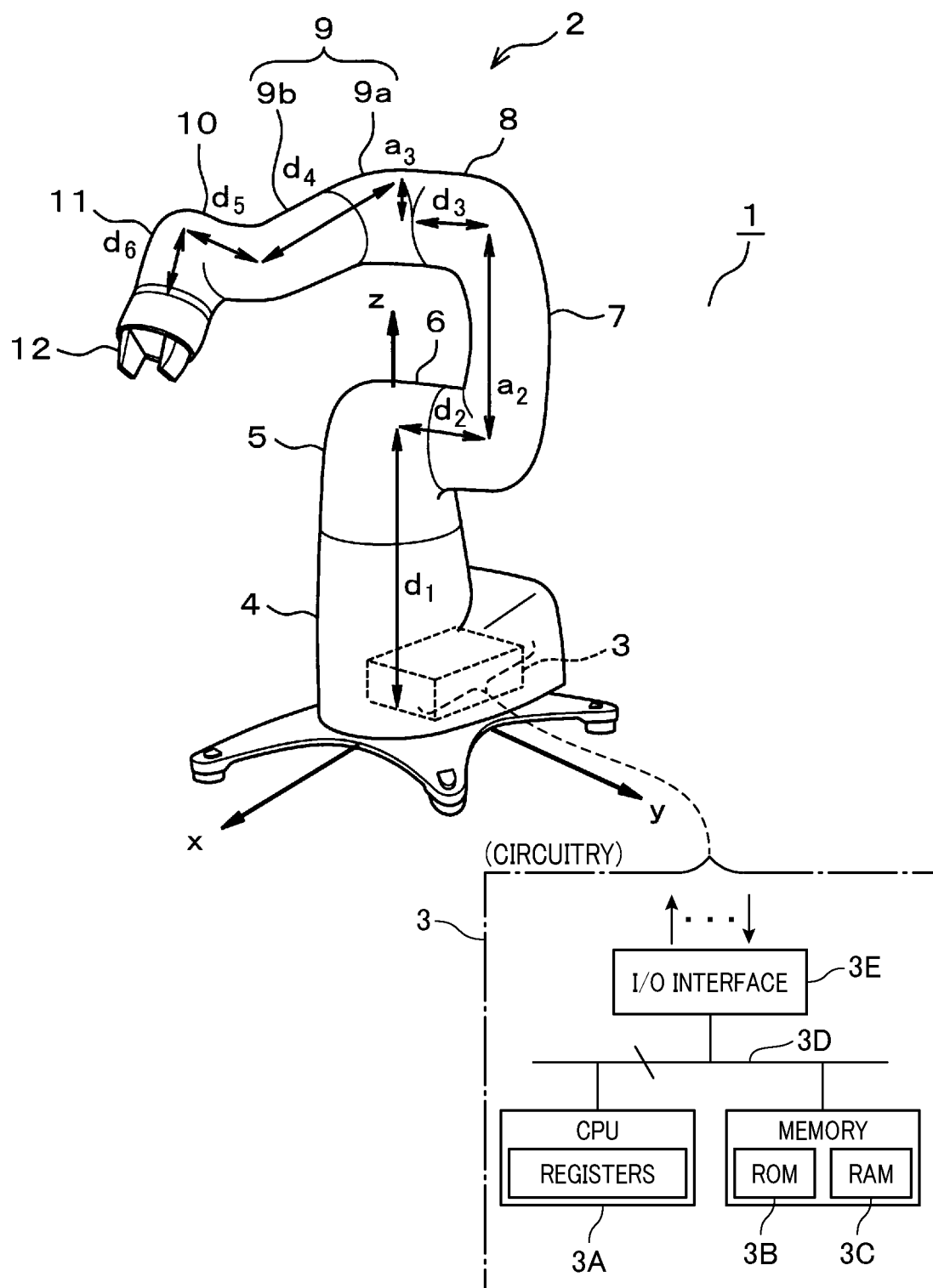
FIG. 1 is a schematic diagram illustrating a configuration of a robot system, according to a first embodiment of the present disclosure.

With reference to the accompanying drawings, several embodiments will be described. In these embodiments, the present disclosure is applied to an apparatus and method for controlling a robot. The components identical with or similar to each other between the following embodiments are given the same reference numerals for the sake of omitting unnecessary explanation.

First Embodiment

Referring to FIGS. 1 to 13, a first embodiment of the present disclosure will be described.

<Configuration of Robot System>

FIG. 1 shows a robot system 1 which includes a vertical articulated robot 2, and a controller 3 provided on the inside of a base 4 to control the robot 2. The robot system 1 is used in general industry. The robot 2 is a six-axis vertical articulated robot. The base 4 has a top to which a shoulder 5 is horizontally rotatably connected via a first axis, as $J_1$, in a z direction.

To the shoulder 5, a lower end of a first arm 7 extending upward is rotatably connected at a right angle via a second offset arm 6 which has a second axis, as $J_2$, in a y direction and extends in the y direction. The first arm 7 has a tip to which a second arm 9 is rotatably connected at a right angle via a third offset arm 8 which has a third axis, as $J_3$, in the y direction and extends in a −y direction. The second arm 9 includes a base portion 9a and a tip portion 9b.

The second arm 9 has a fourth axis, as $J_4$, in an x direction. In the second arm 9, the tip portion 9b is twistably rotatably connected to the base portion 9a. To the tip portion of the second arm 9, a wrist 11 is rotatably connected at a right angle via a fifth offset arm 10 which has an axis, as $J_5$, in the y direction and extends in the −y direction.

Figure 2:
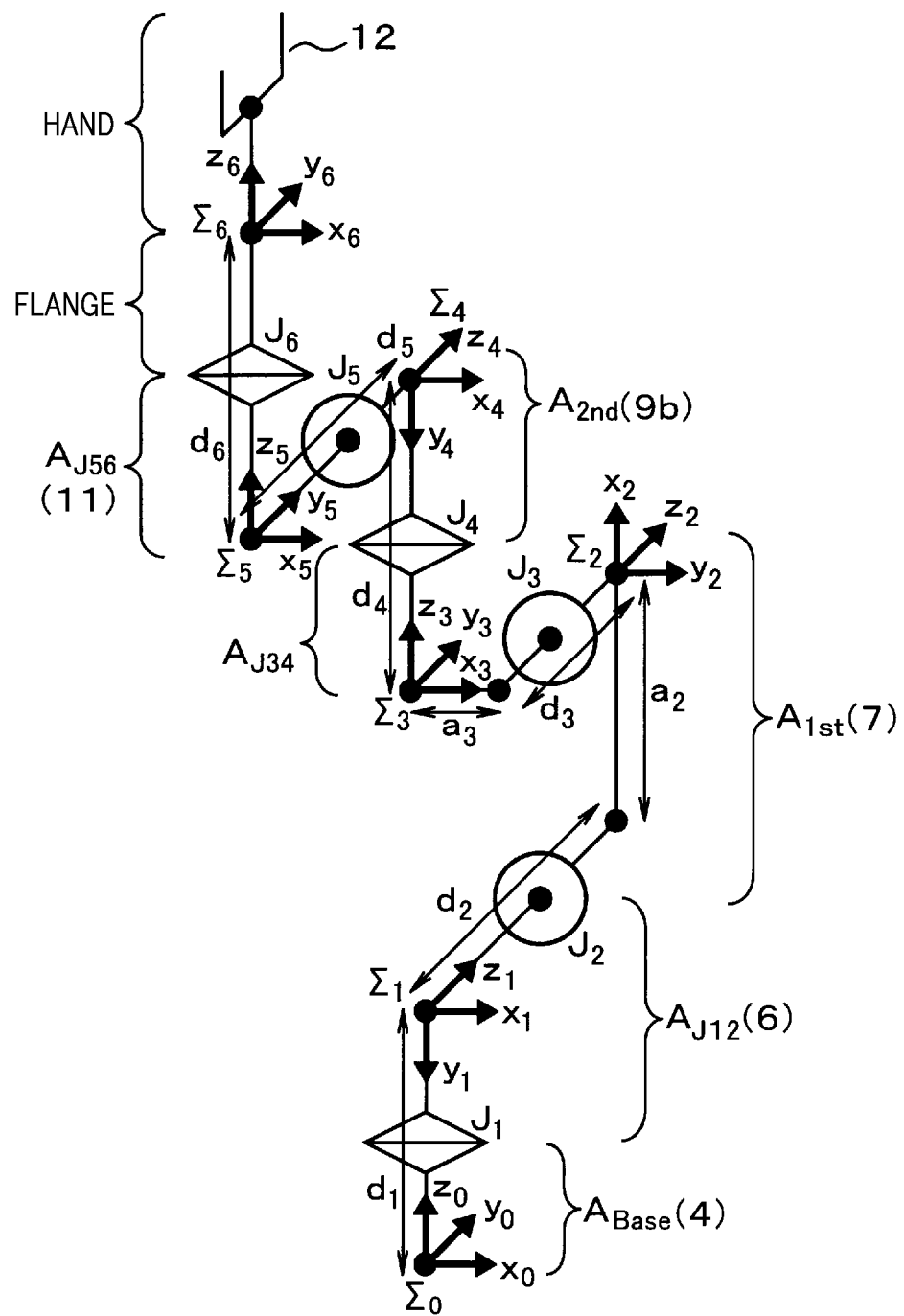
FIG. 2 is a diagram illustrating a coordinate system of the robot, according to the first embodiment.
Figure 3:
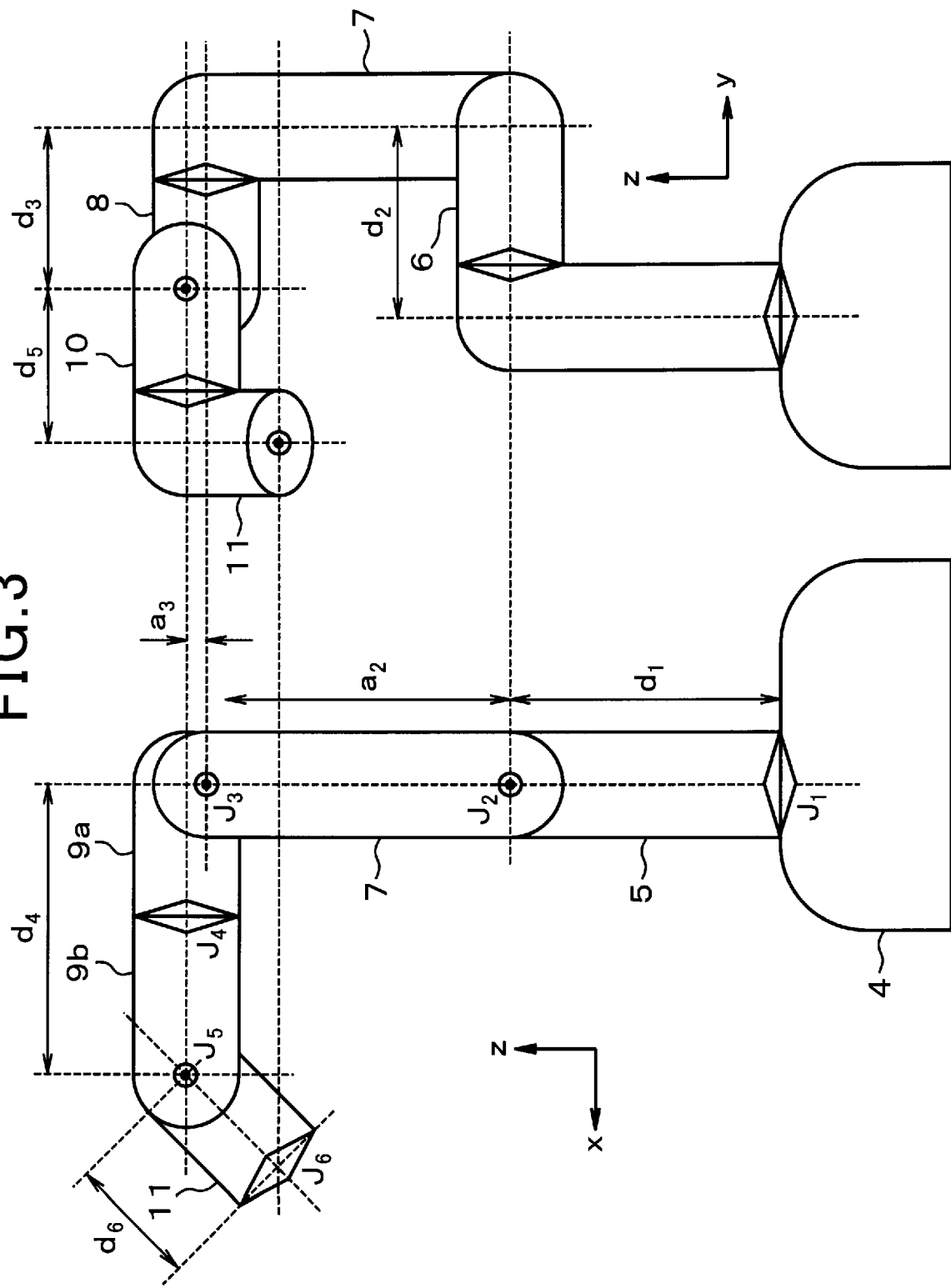
FIG. 3 is a diagram illustrating the configuration of the robot in an x-z plane and a y-z plane, according to the first embodiment.
Figure 4:
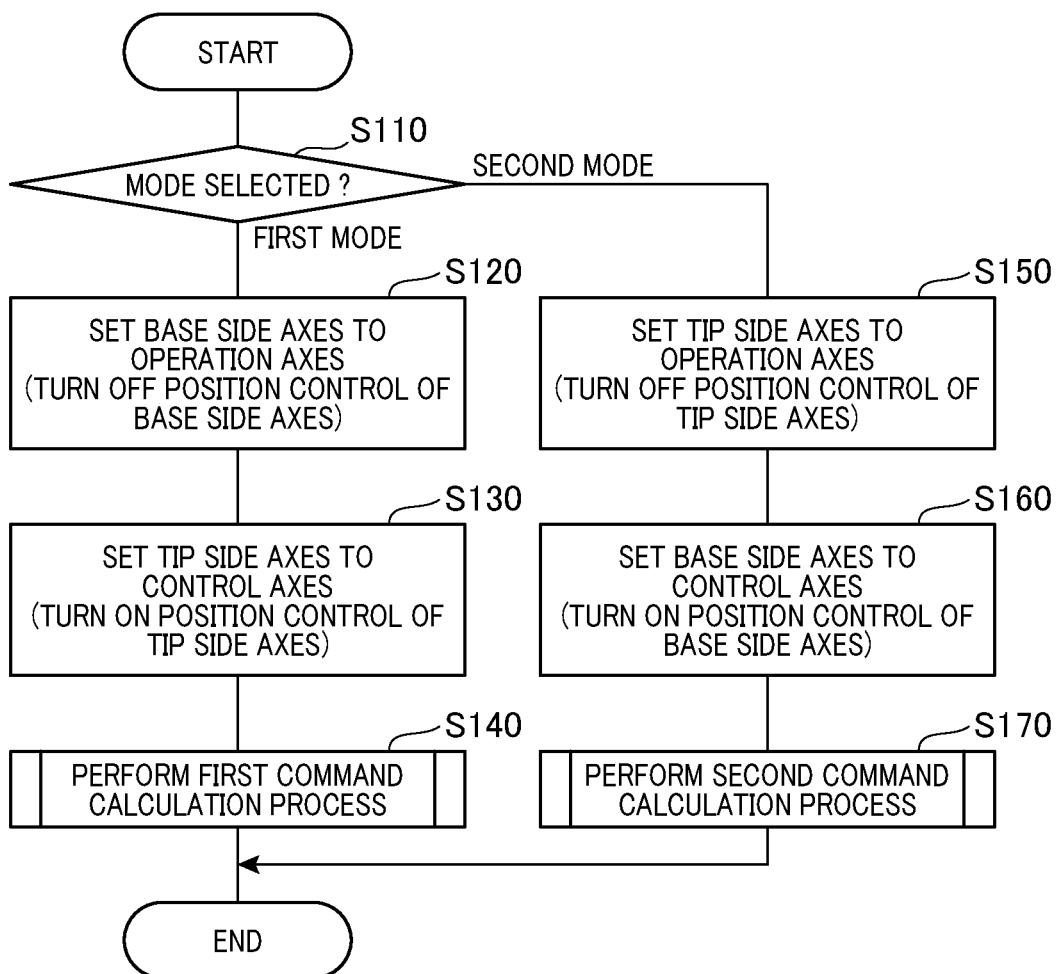
FIG. 4 is a flow diagram illustrating an entire flow of a process relating to direct teaching performed by a controller, according to the first embodiment.

To the wrist 11, a flange and a hand 12 shown in FIG. 2 are twistably rotatably connected via a sixth axis, as $J_6$, in the x direction. The axes $J_1$ to $J_6$ of the robot 2 are respectively provided with motors, not shown, serving as driving sources.

The controller 3 serves as a control unit of the robot 2. The controller 3 controls the robot 2 by executing computer programs by using a control means which includes a CPU (central processing unit) 3A provided with registers for temporary data storage, a ROM (read-only memory) 3B a RAM (random access memory) 3C, an input/output (I/O) interface 3E, and an internal bus 3D communicably connecting those components 3A to 3E, which are exemplified in FIG. 1. The controller 3 also includes position detection circuit (not shown).

The controller 3 is provided with drivers (not shown) each including an inverter circuit, and drives electric motors (not shown) through feedback control, for example, based on rotational positions of the motors detected by the encoders provided to the motors.

The ROM 3B stores system programs, operation programs and the like. Hence, in the present embodiment, the ROM 3B serves as a non-transitory computer-readable recording medium in which such operation and calculation programs are stored in advance so as to enable the CPU 3B to read such program data into a work area thereof. The RAM 3C stores values of parameters when these programs are executed. The position detection circuit receives inputs of detection signals from the encoders, not shown, provided to the respective joints of the robot 2, through the I/O interface 3E. Based on a detection signal received from each encoder, the position detection circuit detects a rotation angle position of the motor provided to the corresponding one of the joints through the I/O interface 3E.

The controller 3 (i.e. the CPU 3A) executes a preset operation program to control a position of a control point of an arm tip and a posture (or attitude) thereof, based on position information inputted from the position detection circuit. In the present embodiment, the controller 3 (i.e. the CPU 3A) performs continuous path (CP) control. During CP control, a target position and posture of a control point of the arm tip when the arm tip is moved to the control point, i.e., a motion path, are determined as a time function. The CPU 3A can also be referred to as a processor, a calculator, a processing unit or others.

In addition to the position and posture as taught, the target position and posture include a position and posture interpolated based the position and posture as taught. The controller 3 controls an angle of each joint of the arm by CP control so that the position and posture of the control point will be parallel to the motion path. When controlling the position and posture, the controller 3 performs inverse transform processing to calculate angles of the first to sixth axes for realizing the currently instructed position and posture.

As shown in FIG. 2, first to sixth coordinate systems $\Sigma_1$ to $\Sigma_6$, which are three-dimensional orthogonal coordinate systems, are defined for the respective joints of the robot 2. The coordinate systems $\Sigma_1$ to $\Sigma_6$ have respective origins at predetermined positions of the respective first to sixth axes $J_1$ to $J_6$. The coordinate systems $\Sigma_1$ to $\Sigma_6$ have z axes, i.e. $z_1$ to $z_6$ axes, respectively aligning with the first to sixth axis lines $J_1$ to $J_6$.

In the base 4, a $0^{th}$ coordinate system $\Sigma_0$ that is a robot coordinate system is defined. The $0^{th}$ coordinate system $\Sigma_0$ does not change if the first to sixth axes rotate. In the present embodiment, the origin of the $0^{th}$ coordinate system $\Sigma_0$ is set on the first axis line $J_1$. The coordinate system $\Sigma_0$ has a z axis, i.e., z0 axis, aligning with the first axis line $J_1$.

FIG. 2 shows $d_1$ to $d_6$, and $a_2$ and $a_3$ which are defined as follows.

$d_1$: Link length from the origin of the $0^{th}$ coordinate system $\Sigma_0$ to the origin of the first coordinate system $\Sigma_1$ $d_2$: Link length from the origin of the first coordinate system $\Sigma_1$ to a base portion of the first arm 7

$a_2$: Link length from the base portion of the first arm 7 to a tip portion thereof, i.e., the origin of the second coordinate system $\Sigma_2$ $d_3$: Link length from the origin of the second coordinate system $\Sigma_2$ to a tip portion of the third offset arm 8

$a_3$: Distance between the third and fourth axes $J_3$ and $J_4$ $d_4$: Link length from the origin of the third coordinate system $\Sigma_3$ to the origin of the fourth coordinate system $\Sigma_4$ $d_5$: Link length from the origin of the fourth coordinate system $\Sigma_4$ to the origin of the fifth coordinate system $\Sigma_5$ $d_6$: Link length from the origin of the fifth coordinate system $\Sigma_5$ to the origin of the sixth coordinate system $\Sigma_6$ For $a_3$, refer to FIG. 3. $d_5$ corresponds to the link length of the fifth offset arm 10.

<Function Relating to Direct Teaching>

The controller 3 of the present embodiment is suitable for direct teaching in which a position and posture of the arm tip of the robot arm 2 are taught by the user directly moving the robot 2. The controller 3 has two modes relating to direct teaching. One is a first mode corresponding to direct teaching in which the posture of an arm tip is constrained. The other is a second mode corresponding to direct teaching in which the position of an arm tip is constrained.

These modes are selected by a predetermined operation of the user. By selecting the first mode, the user can perform direct teaching in which the position of the arm tip is changed while the posture of the arm tip is retained at a target posture. Also, by selecting the second mode, the user can perform direct teaching in which the posture of the arm tip is changed while the position of the arm tip is retained at a target position.

The controller 3 has a function as an axis setting section, in addition to the function as an angle control section for controlling angles of the axes of the robot 2. Such functions of the controller 3 will be described below. First, the user may select a mode for direct teaching and record, in advance, a target position or a target posture to be retained. Then, as shown in the flow diagram of FIG. 4, at step S110, the controller 3 (i.e. the CPU 3A) confirms the mode selected for direct teaching. If the first mode is selected by the user, the determination made at step S110 will be "first mode", and then control proceeds to step S120.

Figure 5:
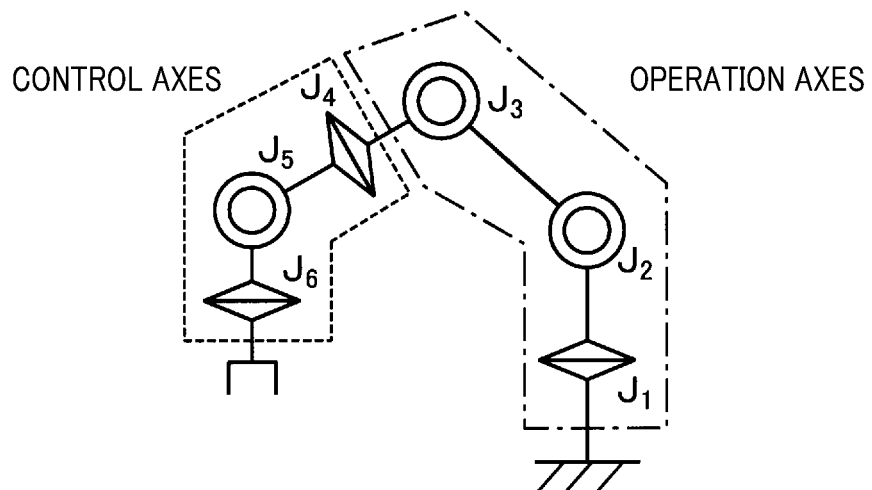
FIG. 5 is a diagram illustrating setting of operation axes and control axes in a first mode, according to the first embodiment.

At step S120, the controller 3 sets, as shown in FIG. 5, three axes, i.e., first, second and third axes ($J_1$, $J_2$ and $J_3$), far from the arm tip, or near the base 4, as being operation axes among the axes ($J_1$ to $J_6$) of the robot 2. In the robot 2, the first, second and third axes can be dominant factors when determining the position of the arm tip, i.e., can be axes dominating (determining) the position of the arm tip. In the following description, these axes may be collectively referred to as base side axes.

Thus, if the first mode is selected, the controller 3 sets the base side axes as being operation axes. The axes set as operation axes are brought into a state of being uncontrolled by the controller 3 functioning as the angle control section, while being brought into a state of being freely operated according to an external force. In other words, if the first mode is selected, the controller 3 turns off position control (angle control) of the base side axes.

After executing step S120, control proceeds to step S130. At step S130, the controller 3 sets, as shown in FIG. 5, three axes, i.e., the fourth, fifth and sixth axes ($J_4$, $J_5$ and $J_6$), near the arm tip as being control axes. In the robot 2, the fourth, fifth and sixth axes can be dominant factors when determining the posture of the arm tip, i.e., can be axes dominating (primary determining) the posture of the arm tip. In the following description, these axes may be collectively referred to as tip side axes.

Thus, if the first mode is selected, the controller 3 sets the tip side axes as being control axes. The axes set as control axes are brought into a state of being controlled by the controller 3 functioning as the angle control section. In other words, if the first mode is selected, the controller 3 turns on position control of the tip side axes. After executing step S130, control proceeds to step S140. At step S140, the controller 3 executes a first command calculation process.

Figure 7:
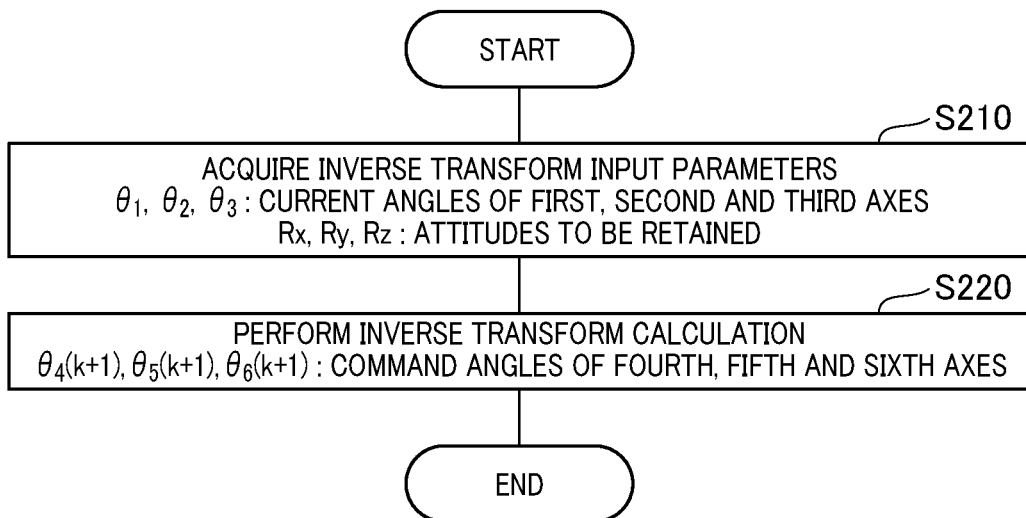
FIG. 7 is a flow diagram illustrating a first command calculation process, according to the first embodiment.

In the first command calculation process, command angles of the control axes ($J_4$, $J_5$ and $J_6$) are calculated using inverse kinematics calculation, based on inputs of current angles and target postures of the operation axes ($J_1$, $J_2$ and $J_3$). For example, a process as shown in FIG. 7 is performed. First, at step S210, the controller 3 acquires inverse transform input parameters. In this case, current angles $\theta_1$, $\theta_2$ and $\theta_3$ of the first, second and third axes, and a target posture of the arm tip, i.e., postures $R_x$, $R_y$ and $R_z$ to be retained, are the inverse transform input parameters.

After executing step S210, control proceeds to step S220. At step S220, the controller 3 performs inverse transform calculation (inverse kinematics calculation) to obtain command angles $\theta_4(k+1)$, $\theta_5(k+1)$ and $\theta_6(k+1)$ of the fourth, fifth and sixth axes, as control axes. After executing step S220, the first command calculation process is terminated. After the first command calculation process has been terminated, the controller 3 performs position control (angle control) of the fourth, fifth and sixth axes, as control axes, based on the calculated command angles.

Figure 6:
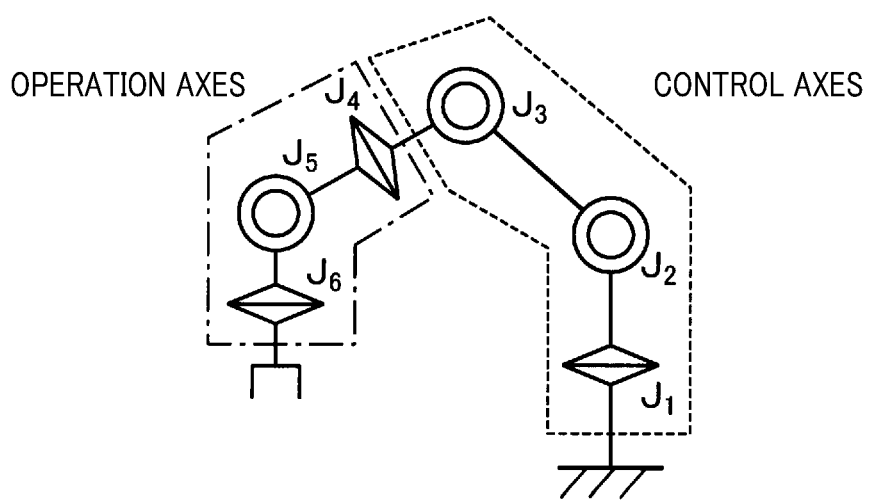
FIG. 6 is a diagram illustrating setting of operation axes and control axes in a second mode, according to the first embodiment.

If the user has selected the second mode, the determination made at step S110 will be "second mode" and thus control proceeds to step S150. At step S150, as shown in FIG. 6, the controller 3 sets the tip side axes ($J_4$, $J_5$ and $J_6$) as being operation axes. In other words, position control of the tip side axes is turned off. Specifically, if the second mode has been selected, the controller 3 sets the tip side axes as being operation axes.

After executing step S150, control proceeds to step S160. At step S160, as shown in FIG. 6, the controller 3 sets the base side axes ($J_1$, $J_2$ and $J_3$) as being control axes. In other words, position control of the base side axes is turned on. Specifically, if the second mode has been selected, the controller 3 sets the base side axes as being control axes. After executing step S160, control proceeds to step S170. At step S170, the controller 3 performs a second command calculation process.

Figure 8:
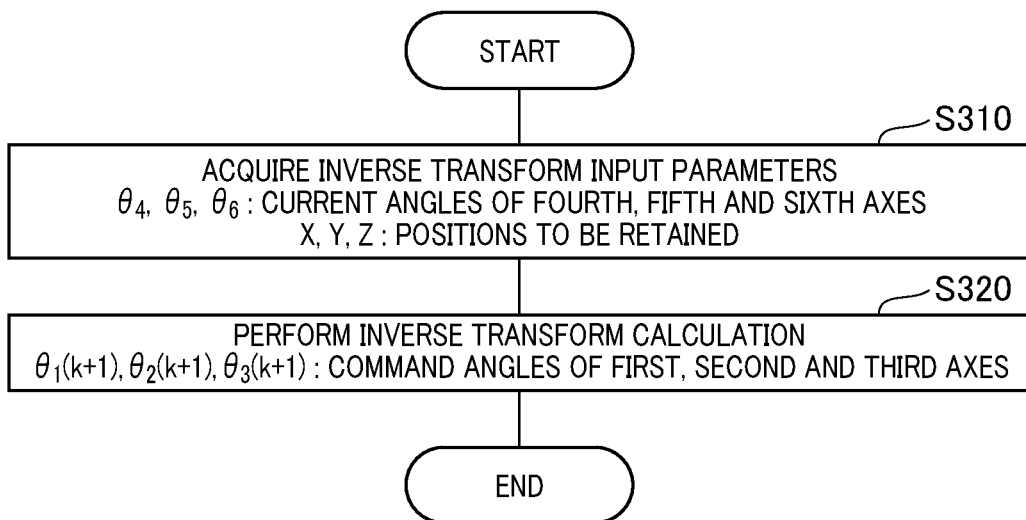
FIG. 8 is a flow diagram illustrating a second command calculation process, according to the first embodiment.

In the second command calculation process, command angles of the control axes ($J_1$, $J_2$ and $J_3$) are calculated using inverse kinematics calculation, based on inputs of current angles and target positions of the operation axes ($J_4$, $J_5$ and $J_6$). For example, a process as shown in FIG. 8 is performed. First, at step S310, the controller 3 acquires inverse transform input parameters. In this case, current angles $\theta_4$, $\theta_5$ and $\theta_6$ of the fourth, fifth and sixth axes, and a target position of the arm tip, i.e., positions X, Y and Z to be retained, are the inverse transform input parameters.

After executing step S310, control proceeds to step S320. At step S320, the controller 3 performs inverse transform calculation (inverse kinematics calculation) to obtain command angles $\theta_1(k+1)$, $\theta_2(k+1)$ and $\theta_3(k+1)$ of the first, second and third axes, as control axes. After executing step S320, the second command calculation process is terminated. After the second command calculation process has been terminated, the controller 3 performs position control (angle control) of the first, second and third axes, as control axes, based on the calculated command angles.

<Forward Transform Processing>

Next, forward transform processing (rectification calculation) will be described as a premise of explaining inverse transform processing (inverse kinematics calculation) of the present embodiment.

First, coordinate conversion is performed in the order of x-axis rotation, z-axis transfer, x-axis transfer and x-axis rotation to determine DH parameters as shown in Table 1. $\theta_i$ corresponds to a rotation angle of each joint from the state shown in FIG. 2.

TABLE 1

DH parameters

| J | $\theta_i$ | $d_i$ (S) | $a_i$ | $\alpha_i$ |
|---|---|---|---|---|
| 1 | $\theta_1$ | $d_1$ | $a_1 = 0$ | −90 |
| 2 | $\theta_2 - 90$ | $d_2$ | $a_2$ | 0 |
| 3 | $\theta_3 + 90$ | $-d_3$ | $-a_3$ | +90 |
| 4 | $\theta_4$ | $d_4$ | 0 | −90 |
| 5 | $\theta_5$ | $-d_5$ | 0 | +90 |
| 6 | $\theta_6$ | $d_6$ | 0 | 0 |

Homogeneous transform matrix from $\Sigma_0$, as a base coordinate, to a mechanical interface coordinate $\Sigma_6$ is as follows. In the matrix, n, o and a respectively indicate a normal vector, an orient vector, and an approach vector. To simplify expression, $\sin \theta_i$ and $\cos \theta_i$ are respectively indicated as $s_i$ and $c_i$. Also, for example, $S_{23}$ indicates $\sin(\theta_i+\theta_3)$.

$$^{i-1}T_i = \begin{bmatrix} \cos\theta_i & -\sin\theta_i & 0 & 0 \\ \sin\theta_i & \cos\theta_i & 0 & 0 \\ 0 & 0 & 1 & 0 \\ 0 & 0 & 0 & 1 \end{bmatrix} \begin{bmatrix} 1 & 0 & 0 & 0 \\ 0 & 1 & 0 & 0 \\ 0 & 0 & 1 & d_i \\ 0 & 0 & 0 & 1 \end{bmatrix} \begin{bmatrix} 1 & 0 & 0 & a_i \\ 0 & 1 & 0 & 0 \\ 0 & 0 & 1 & 0 \\ 0 & 0 & 0 & 1 \end{bmatrix} \begin{bmatrix} 1 & 0 & 0 & 0 \\ 0 & \cos\alpha_i & -\sin\alpha_i & 0 \\ 0 & \sin\alpha_i & \cos\alpha_i & 0 \\ 0 & 0 & 0 & 1 \end{bmatrix} \quad (1)$$

-continued $$^0T_1 = \begin{bmatrix} c_1 & -s_1 & 0 & 0 \\ s_1 & c_1 & 0 & 0 \\ 0 & 0 & 1 & 0 \\ 0 & 0 & 0 & 1 \end{bmatrix} \begin{bmatrix} 1 & 0 & 0 & a_1 \\ 0 & 1 & 0 & 0 \\ 0 & 0 & 1 & d_1 \\ 0 & 0 & 0 & 1 \end{bmatrix} \begin{bmatrix} 1 & 0 & 0 & 0 \\ 0 & 0 & 1 & 0 \\ 0 & -1 & 0 & 0 \\ 0 & 0 & 0 & 1 \end{bmatrix} = \begin{bmatrix} c_1 & 0 & -s_1 & a_1c_1 \\ s_1 & 0 & c_1 & a_1s_1 \\ 0 & -1 & 0 & d_1 \\ 0 & 0 & 0 & 1 \end{bmatrix} \quad (2)$$

$$^1T_2 = \begin{bmatrix} s_2 & c_2 & 0 & 0 \\ -c_2 & s_2 & 0 & 0 \\ 0 & 0 & 1 & 0 \\ 0 & 0 & 0 & 1 \end{bmatrix} \begin{bmatrix} 1 & 0 & 0 & a_2 \\ 0 & 1 & 0 & 0 \\ 0 & 0 & 1 & d_2 \\ 0 & 0 & 0 & 1 \end{bmatrix} \begin{bmatrix} 1 & 0 & 0 & 0 \\ 0 & 1 & 0 & 0 \\ 0 & 0 & 1 & 0 \\ 0 & 0 & 0 & 1 \end{bmatrix} = \begin{bmatrix} s_2 & c_2 & 0 & a_2s_2 \\ -c_2 & s_2 & 0 & -a_2c_2 \\ 0 & 0 & 1 & d_2 \\ 0 & 0 & 0 & 1 \end{bmatrix} \quad (3)$$

$$^2T_3 = \begin{bmatrix} -s_3 & -c_3 & 0 & 0 \\ c_3 & -s_3 & 0 & 0 \\ 0 & 0 & 1 & 0 \\ 0 & 0 & 0 & 1 \end{bmatrix} \begin{bmatrix} 1 & 0 & 0 & -a_3 \\ 0 & 1 & 0 & 0 \\ 0 & 0 & 1 & -d_3 \\ 0 & 0 & 0 & 1 \end{bmatrix} \begin{bmatrix} 1 & 0 & 0 & 0 \\ 0 & 0 & -1 & 0 \\ 0 & 1 & 0 & 0 \\ 0 & 0 & 0 & 1 \end{bmatrix} = \begin{bmatrix} -s_3 & 0 & c_3 & a_3s_3 \\ c_3 & 0 & s_3 & -a_3c_3 \\ 0 & 1 & 0 & -d_3 \\ 0 & 0 & 0 & 1 \end{bmatrix} \quad (4)$$

$$^3T_4 = \begin{bmatrix} c_4 & -s_4 & 0 & 0 \\ s_4 & c_4 & 0 & 0 \\ 0 & 0 & 1 & 0 \\ 0 & 0 & 0 & 1 \end{bmatrix} \begin{bmatrix} 1 & 0 & 0 & 0 \\ 0 & 1 & 0 & 0 \\ 0 & 0 & 1 & d_4 \\ 0 & 0 & 0 & 1 \end{bmatrix} \begin{bmatrix} 1 & 0 & 0 & 0 \\ 0 & 0 & 1 & 0 \\ 0 & -1 & 0 & 0 \\ 0 & 0 & 0 & 1 \end{bmatrix} = \begin{bmatrix} c_4 & 0 & -s_4 & 0 \\ s_4 & 0 & c_4 & 0 \\ 0 & -1 & 0 & d_4 \\ 0 & 0 & 0 & 1 \end{bmatrix} \quad (5)$$

$$^4T_5 = \begin{bmatrix} c_5 & -s_5 & 0 & 0 \\ s_5 & c_5 & 0 & 0 \\ 0 & 0 & 1 & 0 \\ 0 & 0 & 0 & 1 \end{bmatrix} \begin{bmatrix} 1 & 0 & 0 & 0 \\ 0 & 1 & 0 & 0 \\ 0 & 0 & 1 & -d_5 \\ 0 & 0 & 0 & 1 \end{bmatrix} \begin{bmatrix} 1 & 0 & 0 & 0 \\ 0 & 0 & -1 & 0 \\ 0 & 1 & 0 & 0 \\ 0 & 0 & 0 & 1 \end{bmatrix} = \begin{bmatrix} c_5 & 0 & s_5 & 0 \\ s_5 & 0 & -c_5 & 0 \\ 0 & 1 & 0 & -d_5 \\ 0 & 0 & 0 & 1 \end{bmatrix} \quad (6)$$

$$^5T_6 = \begin{bmatrix} c_6 & -s_6 & 0 & 0 \\ s_6 & c_6 & 0 & 0 \\ 0 & 0 & 1 & 0 \\ 0 & 0 & 0 & 1 \end{bmatrix} \begin{bmatrix} 1 & 0 & 0 & 0 \\ 0 & 1 & 0 & 0 \\ 0 & 0 & 1 & d_6 \\ 0 & 0 & 0 & 1 \end{bmatrix} \begin{bmatrix} 1 & 0 & 0 & 0 \\ 0 & 1 & 0 & 0 \\ 0 & 0 & 1 & 0 \\ 0 & 0 & 0 & 1 \end{bmatrix} = \begin{bmatrix} c_6 & -s_6 & 0 & 0 \\ s_6 & c_6 & 0 & 0 \\ 0 & 0 & 1 & d_6 \\ 0 & 0 & 0 & 1 \end{bmatrix} \quad (7)$$

$$^0T_2 = \begin{bmatrix} c_1s_2 & c_1c_2 & -s_1 & x_1 + a_2c_1s_2 - d_2s_1 \\ s_1s_2 & s_1c_2 & c_1 & y_1 + a_2s_1s_2 + d_2c_1 \\ c_2 & -s_2 & 0 & z_1 + a_2c_2 \\ 0 & 0 & 0 & 1 \end{bmatrix} = \begin{bmatrix} n_{x2} & o_{x2} & a_{x2} & x_2 \\ n_{y2} & o_{y2} & a_{y2} & y_2 \\ n_{z2} & o_{z2} & a_{z2} & z_2 \\ 0 & 0 & 0 & 1 \end{bmatrix} \quad (8)$$

$$^0T_3 = \begin{bmatrix} c_1(c_2c_3 - s_2s_3) & -s_1 & c_1(s_2c_3 - c_2s_3) & x_2 - a_3c_1(c_2c_3 - s_2s_3) + d_3c_1 \\ s_1(c_2c_3 - s_2s_3) & c_1 & s_1(s_2c_3 - c_2s_3) & y_2 - a_3s_1(c_2c_3 - s_2s_3) - d_3c_1 \\ -s_2c_3 - c_2s_3 & 0 & c_2c_3 - s_2s_3 & z_2 + a_3(c_2s_3 - s_2c_3) \\ 0 & 0 & 0 & 1 \end{bmatrix} = \quad (9)$$

$$\begin{bmatrix} c_1c_{23} & -s_1 & c_1s_{23} & x_2 - a_3c_1c_{23} + d_3s_1 \\ s_1c_{23} & c_1 & s_1s_{23} & y_2 - a_3s_1c_{23} - d_3c_1 \\ -s_{23} & 0 & c_{23} & z_2 + a_3s_{23} \\ 0 & 0 & 0 & 1 \end{bmatrix} = \begin{bmatrix} n_{x3} & o_{x3} & a_{x3} & x_3 \\ n_{y3} & o_{y3} & a_{y3} & y_3 \\ n_{z3} & o_{z3} & a_{z3} & z_3 \\ 0 & 0 & 0 & 1 \end{bmatrix}$$

$$^0T_4 = \begin{bmatrix} c_1c_{23}c_4 - s_1s_4 & -c_1s_{23} & -c_1c_{23}s_4 - s_1c_4 & x_3 + d_4c_1s_{23} \\ c_1s_4 + s_1c_{23}c_4 & -s_1s_{23} & c_1c_4 - s_1c_{23}s_4 & y_3 + d_4s_1s_{23} \\ -s_{23}c_4 & -c_{23} & s_{23}s_4 & z_3 + d_4c_{23} \\ 0 & 0 & 0 & 1 \end{bmatrix} = \begin{bmatrix} n_{x4} & o_{x4} & a_{x4} & x_4 \\ n_{y4} & o_{y4} & a_{y4} & y_4 \\ n_{z4} & o_{z4} & a_{z4} & z_4 \\ 0 & 0 & 0 & 1 \end{bmatrix} \quad (10)$$

$$^0T_5 = \begin{bmatrix} n_{x4}c_5 + o_{x4}s_5 & a_{x4} & n_{x4}s_5 - o_{x4}c_5 & x_4 - a_{x4}d_5 \\ n_{y4}c_5 + o_{y4}s_5 & a_{y4} & n_{y4}s_5 - o_{y4}c_5 & y_4 - a_{y4}d_5 \\ n_{z4}c_5 + o_{z4}s_5 & a_{z4} & n_{z4}s_5 - o_{z4}c_5 & z_4 - a_{z4}d_5 \\ 0 & 0 & 0 & 1 \end{bmatrix} = \begin{bmatrix} n_{x5} & o_{x5} & a_{x5} & x_5 \\ n_{y5} & o_{y5} & a_{y5} & y_5 \\ n_{z5} & o_{z5} & a_{z5} & z_5 \\ 0 & 0 & 0 & 1 \end{bmatrix} \quad (11)$$

$$^0T_6 = \begin{bmatrix} n_{x5}c_6 + o_{x5}s_6 & -n_{x5}c_6 + o_{x5}c_6 & a_{x5} & x_5 + a_{x5}d_6 \\ n_{y5}c_6 + o_{y5}s_6 & -n_{y5}c_6 + o_{y5}c_6 & a_{y5} & y_5 + a_{y5}d_6 \\ n_{z5}c_6 + o_{z5}s_6 & -n_{z5}c_6 + o_{z5}c_6 & a_{z5} & z_5 + a_{z5}d_6 \\ 0 & 0 & 0 & 1 \end{bmatrix} = \begin{bmatrix} n_{x6} & o_{x6} & a_{x6} & x_6 \\ n_{y6} & o_{y6} & a_{y6} & y_6 \\ n_{z6} & o_{z6} & a_{z6} & z_6 \\ 0 & 0 & 0 & 1 \end{bmatrix} \quad (12)$$

When Formulas (8) to (10) are expanded, Formulas (13) to (15) are obtained.

$$^0T_2 = \begin{bmatrix} c_1s_2 & c_1c_2 & -s_1 & c_1(a_1+a_2s_2)-d_2s_1 \\ s_1s_2 & s_1c_2 & c_1 & s_1(a_1+a_2s_2)+d_2c_1 \\ c_2 & -s_2 & 0 & d_1+a_2c_2 \\ 0 & 0 & 0 & 1 \end{bmatrix} \quad (13)$$

$$^0T_3 = \begin{bmatrix} c_1c_{23} & -s_1 & c_1s_{23} & c_1(a_1+a_2s_2-a_3c_{23})-s_1(d_2-d_3) \\ s_1c_{23} & c_1 & s_1s_{23} & s_1(a_1+a_2s_2-a_3c_{23})+c_1(d_2-d_3) \\ -s_{23} & 0 & c_{23} & d_1+a_2c_2+a_3s_{23} \\ 0 & 0 & 0 & 1 \end{bmatrix} \quad (14)$$

$$^0T_4 = \begin{bmatrix} c_1c_{23}c_4-s_1s_4 & -c_1c_{23}s_4-s_1c_4 & -c_1s_{23} & c_1(a_1+a_2s_2-a_3c_{23}+d_4s_{23})-s_1(d_2-d_3) \\ c_1s_4+s_1c_{23}c_4 & c_1c_4-s_1c_{23}s_4 & -s_1s_{23} & s_1(a_1+a_2s_2-a_3c_{23}+d_4s_{23})+c_1(d_2-d_3) \\ -s_{23}c_4 & s_{23}s_4 & -c_{23} & d_1+a_2c_2+a_3s_{23}+d_4c_{23} \\ 0 & 0 & 0 & 1 \end{bmatrix} \quad (15)$$

The normal, orient and approach vectors and the position coordinates of the fifth and sixth axes are as follows.

$$\begin{bmatrix} n_{x5} \\ n_{y5} \\ n_{z5} \end{bmatrix} = \begin{bmatrix} c_1(c_{23}c_4c_5-s_{23}s_5)-s_1s_4c_5 \\ s_1(c_{23}c_4c_5-s_{23}s_5)+c_1s_4c_5 \\ -s_{23}c_4c_5-c_{23}s_5 \end{bmatrix} \quad (16)$$

$$\begin{bmatrix} o_{x5} \\ o_{y5} \\ o_{z5} \end{bmatrix} = \begin{bmatrix} -c_1c_{23}s_1-s_1c_4 \\ -s_1c_{23}s_4+c_1c_4 \\ s_{23}s_4 \end{bmatrix}$$

$$\begin{bmatrix} a_{x5} \\ a_{y5} \\ a_{z5} \end{bmatrix} = \begin{bmatrix} c_1(c_{23}c_4s_5+s_{23}c_5)-s_1s_4s_5 \\ s_1(c_{23}c_4s_5+s_{23}c_5)+c_1s_4s_5 \\ -s_{23}c_4s_5+c_{23}c_5 \end{bmatrix}$$

$$\begin{bmatrix} x_5 \\ y_5 \\ z_5 \end{bmatrix} = \begin{bmatrix} c_1(a_1+a_2s_2-(a_3-s_4d_5)c_{23}+d_4s_{23})- \\ s_1(d_2-d_3-c_4d_5) \\ s_1(a_1+a_2s_2-(a_3-s_4d_5)c_{23}+d_4s_{23})+ \\ c_1(d_2-d_3-c_4d_5) \\ d_1+a_2c_2+(a_3-s_4d_5)s_{23}+d_4c_{23} \end{bmatrix} \quad (17)$$

$$\begin{bmatrix} n_{x6} \\ n_{y6} \\ n_{z6} \end{bmatrix} = \begin{bmatrix} c_1(c_{23}(c_4c_5c_6-s_4s_6)-s_{23}s_5c_6)-s_1(s_4c_5c_6+c_4s_6) \\ s_1(c_{23}(c_4c_5c_6-s_4s_6)-s_{23}s_5c_6)+c_1(s_4c_5c_6+c_4s_6) \\ s_{23}(-c_4c_5c_6+s_4s_6)-c_{23}s_5c_6 \end{bmatrix}$$

$$\begin{bmatrix} o_{x6} \\ o_{y6} \\ o_{z6} \end{bmatrix} = \begin{bmatrix} c_1(-c_{23}(c_4c_5c_6+s_4s_6)+s_{23}s_5s_6)+s_1(s_4c_5s_6-c_4c_6) \\ s_1(-c_{23}(c_4c_5c_6-s_4s_6)-s_{23}s_5c_6)-c_1(s_4c_5s_6-c_4c_6) \\ s_{23}(-c_4c_5c_6+s_4s_6)-c_{23}s_5c_6 \end{bmatrix} \quad (18)$$

$$\begin{bmatrix} a_{x6} \\ a_{y6} \\ a_{z6} \end{bmatrix} = \begin{bmatrix} c_1(c_{23}c_4s_5+s_{23}c_5)-s_1s_4s_5 \\ s_1(c_{23}c_4s_5+s_{23}c_5)+c_1s_4s_5 \\ -s_{23}c_4s_5+c_{23}c_5 \end{bmatrix}$$

$$\begin{bmatrix} x_6 \\ y_6 \\ z_6 \end{bmatrix} = \quad (19)$$

$$\begin{bmatrix} c_1(a_1+a_2s_2-(a_3-s_4d_5-c_4s_5d_6)c_{23}+(d_4+c_5d_6)s_{23})- \\ s_1(d_2-d_3-c_4d_5+s_4s_5d_6) \\ s_1(a_1+a_2s_2-(a_3-s_4d_5-c_4s_5d_6)c_{23}+(d_4+c_5d_6)s_{23})+ \\ c_1(d_2-d_3-c_4d_5+s_4s_5d_6) \\ d_1+a_2c_2+(a_3-s_4d_5-c_4s_5d_6)s_{23}+(d_4+c_5d_6)c_{23} \end{bmatrix}$$

Since the matrix is a homogeneous transform matrix, a position vector on a tool coordinate system may be multiplied from the left for conversion into a position vector on the base coordinate $\Sigma_0$. Specifically, an arm tip position on the base coordinate can be calculated from the joint angles and the DH parameters. The posture angle is expressed by normal, orient and approach vectors $n_6$, $o_6$ and $a_6$ of the sixth axis.

<Inverse Transform Processing in the First Command Calculation Process>

Next, a specific example of the inverse transform calculation (inverse transform processing) in the first command calculation process will be described. Specifically, when realizing a function of retaining only the posture during direct teaching, the first, second and third axes are permitted to passively move due to an external force. The following description explains an example of a method of calculating angle command values when controlling the fourth, fifth and sixth axes in terms of an angle for this passive movement.

The angles and postures of the first, second and third axes are assumed to be given by the homogeneous transform matrix (ignoring position components). In other words, Formulas (20) and Formula (21), which ignores position component, are known numerical values.

$$^0T_3 = \begin{bmatrix} c_1c_{23} & -s_1 & c_1s_{23} & x_2-a_3c_1c_{23}+d_3s_1 \\ s_1c_{23} & c_1 & s_1s_{23} & y_2-a_3s_1c_{23}-d_3c_1 \\ -s_{23} & 0 & c_{23} & z_2+a_3s_{23} \\ 0 & 0 & 0 & 1 \end{bmatrix} = \quad (20)$$

$$\begin{bmatrix} n_{x3} & o_{x3} & a_{x3} & x_3 \\ n_{y3} & o_{y3} & a_{y3} & y_3 \\ n_{z3} & o_{z3} & a_{z3} & z_3 \\ 0 & 0 & 0 & 1 \end{bmatrix}$$

$$^0T_6 = \begin{bmatrix} n_{x6} & o_{x6} & a_{x6} & x_6 \\ n_{y6} & o_{y6} & a_{y6} & y_6 \\ n_{z6} & o_{z6} & a_{z6} & z_6 \\ 0 & 0 & 0 & 1 \end{bmatrix} \quad (21)$$

In this case, the fourth, fifth and sixth axes can be calculated by calculating a $\Sigma_6$ coordinate from the $\Sigma_3$ coordinate. This may be solved so that equality is established between Formulas (23) and (21).

$$^3T_6 = \begin{bmatrix} c_4 & 0 & -s_4 & 0 \\ s_4 & 0 & c_4 & 0 \\ 0 & -1 & 0 & d_4 \\ 0 & 0 & 0 & 1 \end{bmatrix} \begin{bmatrix} c_5 & 0 & s_5 & 0 \\ s_5 & 0 & -c_5 & 0 \\ 0 & 1 & 0 & -d_5 \\ 0 & 0 & 0 & 1 \end{bmatrix} \quad (22)$$

$$\begin{bmatrix} c_6 & -s_6 & 0 & 0 \\ s_6 & c_6 & 0 & 0 \\ 0 & 0 & 1 & d_6 \\ 0 & 0 & 0 & 1 \end{bmatrix} = \begin{bmatrix} c_4c_5 & -s_4 & c_4s_5 & d_5s_4 \\ s_4c_5 & c_4 & s_4s_5 & -d_5c_4 \\ -s_5 & 0 & c_5 & d_4 \\ 0 & 0 & 0 & 1 \end{bmatrix}$$

$$\begin{bmatrix} c_6 & -s_6 & 0 & 0 \\ s_6 & c_6 & 0 & 0 \\ 0 & 0 & 1 & d_6 \\ 0 & 0 & 0 & 1 \end{bmatrix} =$$

$$\begin{bmatrix} c_4c_5c_6 - s_4s_6 & -c_4c_5s_6 - s_4c_6 & c_4s_5 & d_6c_4s_5 + d_5s_4 \\ s_4c_5c_6 + c_4s_6 & -s_4c_5s_6 + c_4c_6 & s_4s_5 & d_6s_4s_5 - d_5c_4 \\ -s_5c_6 & s_5s_6 & c_5 & d_6c_5 + d_4 \\ 0 & 0 & 0 & 1 \end{bmatrix}$$

$$^0T_6 = \begin{bmatrix} n_{x3} & o_{x3} & a_{x3} & x_3 \\ n_{y3} & o_{y3} & a_{y3} & y_3 \\ n_{z3} & o_{z3} & a_{z3} & z_3 \\ 0 & 0 & 0 & 1 \end{bmatrix} \quad (23)$$

$$\begin{bmatrix} c_4c_5c_6 - s_4s_6 & -c_4c_5s_6 - s_4c_6 & c_4s_5 & d_6c_4s_5 + d_5s_4 \\ s_4c_5c_6 + c_4s_6 & -s_4c_5s_6 + c_4c_6 & s_4s_5 & d_6s_4s_5 - d_5c_4 \\ -s_5c_6 & s_5s_6 & c_5 & d_6c_5 + d_4 \\ 0 & 0 & 0 & 1 \end{bmatrix}$$

Equality is established in Formula (24) where the right side expresses a simple matrix calculation. When the result of the calculation of the right side of Formula (24) is expressed by Formula (25), Formula (26) may be solved for the angles of the fourth, fifth and sixth axes.

$$\begin{bmatrix} c_4c_5c_6 - s_4s_6 & -c_4c_5s_6 - s_4c_6 & c_4s_5 & d_6c_4s_5 + d_5s_4 \\ s_4c_5c_6 + c_4s_6 & -s_4c_5s_6 + c_4c_b & s_4s & d_6s_4s_5 - d_5c_4 \\ -s_5c_6 & s_5s_6 & c_5 & d_6c_5 + d_4 \\ 0 & 0 & 0 & 1 \end{bmatrix} = \quad (24)$$

$$\begin{bmatrix} n_{x3} & o_{x3} & a_{x3} & x_3 \\ n_{y3} & o_{y3} & a_{y3} & y_3 \\ n_{z3} & o_{z3} & a_{z3} & z_3 \\ 0 & 0 & 0 & 1 \end{bmatrix}^{-1} \begin{bmatrix} n_{x6} & o_{x6} & a_{x6} & x_6 \\ n_{y6} & o_{y6} & a_{y6} & y_6 \\ n_{z6} & o_{z6} & a_{z6} & z_6 \\ 0 & 0 & 0 & 1 \end{bmatrix}$$

$$\begin{bmatrix} n_x & o_x & a_x & x \\ n_y & o_y & o_y & y \\ n_z & o_z & a_z & z \\ 0 & 0 & 0 & 1 \end{bmatrix} = \begin{bmatrix} n_{x3} & o_{x3} & a_{x3} & x_3 \\ n_{y3} & o_{y3} & a_{y3} & y_3 \\ n_{z3} & o_{z3} & a_{z3} & z_3 \\ 0 & 0 & 0 & 1 \end{bmatrix}^{-1} \begin{bmatrix} n_{x6} & o_{x6} & a_{x6} & x_6 \\ n_{y6} & o_{y6} & a_{y6} & y_6 \\ n_{z6} & o_{z6} & a_{z6} & z_6 \\ 0 & 0 & 0 & 1 \end{bmatrix} \quad (25)$$

$$\begin{bmatrix} c_4c_5c_6 - s_4s_6 & -c_4c_5s_6 - s_4c_6 & c_4s_5 & d_6c_4s_5 + d_5s_4 \\ s_4c_5c_6 + c_4s_6 & -s_4c_5s_6 + c_4c_6 & s_4s_5 & d_6s_4s_5 - d_sc_4 \\ -s_5c_6 & s_5s_6 & c_5 & d_6c_5 + d_4 \\ 0 & 0 & 0 & 1 \end{bmatrix} = \quad (26)$$

$$\begin{bmatrix} n_x & o_x & a_x & x \\ n_y & o_y & a_y & y \\ n_z & o_z & a_z & z \\ 0 & 0 & 0 & 1 \end{bmatrix}$$

First, when calculating the fifth axis angle, two solutions are obtained. To select a suitable solution from these two solutions, movable ranges of the fourth, fifth and sixth axes are checked and all of the axis angles are solved. After that, solutions with a total value having a smallest difference from the current values (current angles) may be selected.

$$c_5 = a_z \quad (27)$$

$$\theta_5 = \pm a \cos a_z \quad (28)$$

The fifth axis angle may be calculated as follows.

$$s_5 = \sqrt{1 - c_5^2} \quad (29)$$

$$\theta_5 = a \tan(c_5, s_5) \quad (30)$$

In the following case, the fourth and sixth axes are indefinite and thus may indicate a singular point.

$$s_5 \cong 0 \quad (31)$$

When calculating the fourth axis from an XY component of the approach vector and when calculating the sixth axis from the normal and orient vectors, the following formulas are established.

$$c_4 s_5 = a_x \quad (32)$$

$$s_4 s_5 = a_y \quad (33)$$

$$-s_5 c_6 = n_z \quad (34)$$

$$s_5 s_6 = o_z \quad (35)$$

$$c_4 = \frac{a_x}{s_5} \quad (36)$$

$$s_4 = \frac{a_y}{s_5} \quad (37)$$

$$c_6 = -\frac{n_z}{s_5} \quad (38)$$

$$s_6 = \frac{o_z}{s_5} \quad (39)$$

$$\theta_4 = \mathrm{atan}(c_4, s_4) \quad (40)$$

$$\theta_6 = \mathrm{atan}(c_6, s_6) \quad (41)$$

The inverse transform calculation described above is targeted to the robot 2 of the present embodiment in which a wrist offset $d_5$ is not zero ($d_5 \neq 0$). However, this inverse transform calculation may be applied to a generally used PUMA six-axis robot having no offset ($d_5 = 0$) in a wrist portion. It should be noted that, if the wrist offset $d_5$ is zero, Formula (26) can be changed to Formula (42). However, portions involved in the change are only those portions which are not related to angle determination of the fourth, fifth and sixth axes, and accordingly inverse transform remains unchanged.

$$\begin{bmatrix} c_4c_5c_6 - s_4s_6 & -c_4c_5s_6 - s_4c_6 & c_4s_5 & d_6c_4s_5 \\ s_4c_5c_6 + c_4s_6 & -s_4c_5s_6 + c_4c_6 & s_4s_5 & d_6s_4s_5 \\ -s_5c_6 & s_5s_6 & c_5 & d_6c_5 + d_4 \\ 0 & 0 & 0 & 1 \end{bmatrix} = \begin{bmatrix} n_x & o_x & a_x & x \\ n_y & o_y & a_y & y \\ n_z & o_z & a_z & z \\ 0 & 0 & 0 & 1 \end{bmatrix} \quad (42)$$

<Inverse Transform Processing in the Second Command Calculation Process>

Next, a specific example of a inverse transform calculation (inverse transform processing) in the second command calculation process will be described. Specifically, when realizing a function of retaining only the position of a tool tip during direct teaching, the fourth, fifth and sixth axes are permitted to passively move relative to an external force. The following description explains an example of a method of calculating angle command values when controlling the angles of the first, second and third axes in terms of this passive movement.

First, a homogeneous transform matrix from a flange center to a tool tip position is obtained. Formula (43), which is given in advance as a definition, uses known numerical values.

$$^6T_{tool} = \begin{bmatrix} c_{tz} & -s_{tz} & 0 & X_t \\ s_{tz} & c_{tz} & 0 & Y_t \\ 0 & 0 & 1 & Z_t \\ 0 & 0 & 0 & 1 \end{bmatrix} \begin{bmatrix} c_{ty} & 0 & -s_{ty} & 0 \\ 0 & 1 & 0 & 0 \\ s_{ty} & 0 & c_{ty} & 0 \\ 0 & 0 & 0 & 1 \end{bmatrix} \begin{bmatrix} 1 & 0 & 0 & 0 \\ 0 & c_{tx} & s_{tx} & 0 \\ 0 & -s_{tx} & c_{tx} & 0 \\ 0 & 0 & 0 & 1 \end{bmatrix} \quad (43)$$

$$= \begin{bmatrix} c_{ty}c_{tz} & -c_{tx}s_{tz}+s_{tx}s_{ty}c_{tz} & -s_{tx}s_{tz}-c_{tx}s_{ty}c_{tz} & X_t \\ c_{ty}s_{tz} & c_{tx}c_{tz}+s_{tx}s_{ty}s_{tz} & s_{tx}c_{tz}-c_{tx}s_{ty}s_{tz} & Y_t \\ s_{ty} & -s_{tx}c_{ty} & c_{tx}c_{ty} & Z_t \\ 0 & 0 & 0 & 1 \end{bmatrix}$$

$$= \begin{bmatrix} n_{x6t} & o_{x6t} & a_{x6t} & x_{6t} \\ n_{y6t} & o_{y6t} & a_{y6t} & y_{6t} \\ n_{z6t} & o_{z6t} & a_{z6t} & z_{6t} \\ 0 & 0 & 0 & 1 \end{bmatrix}$$

Furthermore, a homogeneous transform matrix from the base coordinate system to the tool tip may be expressed as Formula (44).

$$^0T_{tool} = {^0T_6}\,{^6T_{tool}} = \begin{bmatrix} n_{x6} & o_{x6} & a_{x6} & x_6 \\ n_{y6} & o_{y6} & a_{y6} & y_6 \\ n_{z6} & o_{z6} & a_{z6} & z_6 \\ 0 & 0 & 0 & 1 \end{bmatrix} \quad (44)$$

$$\begin{bmatrix} n_{x6t} & o_{x6t} & a_{x6t} & x_{6t} \\ n_{y6t} & o_{y6t} & a_{y6t} & y_{6t} \\ n_{z6t} & o_{z6t} & a_{z6t} & z_{6t} \\ 0 & 0 & 0 & 1 \end{bmatrix} = \begin{bmatrix} n_{xt} & o_{xt} & a_{xt} & x_t \\ n_{yt} & o_{yt} & a_{yt} & y_t \\ n_{zt} & o_{zt} & a_{zt} & z_t \\ 0 & 0 & 0 & 1 \end{bmatrix}$$

Since several factors of $^3T_6$, which may make the formula complicated, may come out afterward, each factor is singularly calculated and replaced with a constant variable.

$$^3T_6 = {^3T_4}\,{^4T_5}\,{^5T_6} \quad (45)$$

$$= \begin{bmatrix} c_4 & 0 & -s_4 & 0 \\ s_4 & 0 & c_4 & 0 \\ 0 & -1 & 0 & d_4 \\ 0 & 0 & 0 & 1 \end{bmatrix} \begin{bmatrix} c_5 & 0 & s_5 & 0 \\ s_5 & 0 & -c_5 & 0 \\ 0 & 1 & 0 & -d_5 \\ 0 & 0 & 0 & 1 \end{bmatrix}$$

$$\begin{bmatrix} c_6 & -s_6 & 0 & 0 \\ s_6 & c_6 & 0 & 0 \\ 0 & 0 & 1 & d_6 \\ 0 & 0 & 0 & 1 \end{bmatrix}$$

$$= \begin{bmatrix} c_4c_5c_6 - s_4s_6 & -c_4c_5s_6 - s_4c_6 & c_4s_5 & s_4d_5 + c_4s_5d_6 \\ s_4c_5c_6 + c_4s_6 & -s_4c_5s_6 + c_4c_6 & s_4s_5 & -c_4d_5 + s_4s_5d_6 \\ -s_5c_6 & s_5s_6 & c_5 & d_4 + c_5d_6 \\ 0 & 0 & 0 & 1 \end{bmatrix}$$

$$= \begin{bmatrix} n_{x36} & o_{x36} & a_{x36} & x_{36} \\ n_{y36} & o_{y36} & a_{y36} & y_{36} \\ n_{z36} & o_{z36} & a_{z36} & z_{36} \\ 0 & 0 & 0 & 1 \end{bmatrix}$$

In this case, since the position component of Formula (44) and angles of the fourth, fifth and sixth axes are already available, the angles of the first, second and third axes may be calculated from the following Formulas (46) to (50).

$$\begin{bmatrix} x_t \\ y_t \\ z_t \end{bmatrix} = \begin{bmatrix} n_{x6}x_{6t} + o_{x6}y_{6t} + a_{x6}z_{6t} + x_6 \\ n_{y6}x_{6t} + o_{y6}y_{6t} + a_{y6}z_{6t} + y_6 \\ n_{z6}x_{6t} + o_{z6}y_{6t} + a_{z6}z_{6t} + z_6 \end{bmatrix} \quad (46)$$

$$\begin{bmatrix} n_{x6} \\ n_{y6} \\ n_{z6} \end{bmatrix} = \begin{bmatrix} c_1(c_{23}(c_4c_5c_6 - s_4s_6) - s_{23}s_5c_6) - s_1(s_4c_5c_6 + c_4s_6) \\ s_1(c_{23}(c_4c_5c_6 - s_4s_6) - s_{23}s_5c_6) + c_1(s_4c_5c_6 + c_4s_6) \\ s_{23}(-c_4c_5c_6 + s_4s_6) - c_{23}s_5c_6 \end{bmatrix} = \begin{bmatrix} c_1(c_{23}n_{x36} - s_{23}s_5c_6) - s_1n_{y36} \\ s_1(c_{23}n_{x36} - s_{23}s_5c_6) + c_1n_{y36} \\ -s_{23}n_{x36} - c_{23}s_5c_6 \end{bmatrix} \quad (47)$$

$$\begin{bmatrix} o_{x6} \\ o_{y6} \\ o_{z6} \end{bmatrix} = \begin{bmatrix} c_1(-c_{23}(c_4c_5s_6 + s_4c_6) + s_{23}s_5s_6) + s_1(s_4c_5s_6 - c_4c_6) \\ s_1(-c_{23}(c_4c_5s_6 + s_4c_6) + s_{23}s_5s_6) - c_1(s_4c_5s_6 - c_4c_6) \\ (c_4c_5s_6 + s_4c_6)s_{23} + s_5s_6c_{23} \end{bmatrix} = \begin{bmatrix} c_1(c_{23}o_{x36} + s_{23}s_5s_6) - s_1o_{y36} \\ s_1(c_{23}o_{x36} + s_{23}s_5s_6) + c_1o_{y36} \\ -s_{23}o_{x36} + c_{23}s_5s_6 \end{bmatrix} \quad (48)$$

$$\begin{bmatrix} a_{x6} \\ a_{y6} \\ a_{z6} \end{bmatrix} = \begin{bmatrix} c_1(c_{23}c_4s_5 + s_{23}c_5) - s_1s_4s_5 \\ s_1(c_{23}c_4s_5 + s_{23}c_5) + c_1s_4s_5 \\ -s_{23}c_4s_5 + c_{23}c_5 \end{bmatrix} = \begin{bmatrix} c_1(c_{23}a_{x36} + s_{23}c_5) - s_1a_{y36} \\ s_1(c_{23}a_{x36} + s_{23}c_5) + c_1a_{y36} \\ -s_{23}a_{x36} + c_{23}c_5 \end{bmatrix} \quad (49)$$

$$\begin{bmatrix} x_6 \\ y_6 \\ z_6 \end{bmatrix} = \begin{bmatrix} c_1(a_1 + a_2s_2 - (a_3 - s_4d_5 - c_4s_5d_6)c_{23} + (d_4 + c_5d_6)s_{23}) - s_1(d_2 - d_3 - c_4d_5 + s_4s_5d_6) \\ s_1(a_1 + a_2s_2 - (a_3 - s_4d_5 - c_4s_5d_6)c_{23} + (d_4 + c_5d_6)s_{23}) + c_1(d_2 - d_3 - c_4d_5 + s_4s_5d_6) \\ d_1 + a_2c_2 + (a_3 - s_4d_5 - c_4s_5d_6)s_{23} + (d_4 + c_5d_6)c_{23} \end{bmatrix} \quad (50)$$

$$= \begin{bmatrix} c_1(a_1 + a_2s_2 - (a_3 - x_{36})c_{23} + z_{36}s_{23}) - s_1(d_2 - d_3 + y_{36}) \\ s_1(a_1 + a_2s_2 - (a_3 - x_{36})c_{23} + z_{36}s_{23}) + c_1(d_2 - d_3 + y_{36}) \\ d_1 + a_2c_2 + (a_3 - x_{36})s_{23} + z_{36}c_{23} \end{bmatrix}$$

First, a first axis angle is calculated. When Formula (46) is expanded, Formulas (51), (52) and (53) are obtained.

$$x_t = n_{x6}x_{6t} + o_{x6}y_{6t} + a_{x6}z_{6t} + x_6 \quad (51)$$
$$= (c_1(c_{23}n_{x36} - s_{23}s_5c_6) - s_1n_{y36})x_{6t} +$$
$$(c_1(c_{23}o_{x36} + s_{23}s_5s_6) - s_1o_{y36})y_{6t} +$$
$$(c_1(c_{23}a_{x36} + s_{23}c_5) - s_1a_{y36})z_{6t} +$$
$$c_1(a_1 + a_2s_2 - (a_3 - x_{36})c_{23} + z_{36}s_{23}) - s_1(d_2 - d_3 + y_{36})$$
$$= c_1((c_{23}n_{x36} - s_{23}s_5c_6)x_{6t} + (c_{23}o_{x36} + s_{23}s_5s_6)y_{6t} +$$
$$(c_{23}a_{x36} + s_{23}c_5)z_{6t} + (a_1 + a_2s_2 -$$
$$(a_3 - x_{36})c_{23} + z_{36}s_{23})) -$$
$$s_1(n_{y36}x_{6t} + o_{y36}y_{6t} + a_{y36}z_{6t} + (d_2 - d_3 + y_{36}))$$

$$y_t = n_{y6}x_{6t} + o_{y6}y_{6t} + a_{y6}z_{6t} + y_6 \quad (52)$$
$$= (s_1(c_{23}n_{x36} - s_{23}s_5c_6) + c_1n_{y36})x_{6t} +$$
$$(s_1(c_{23}o_{x36} + s_{23}s_5s_6) + c_1o_{y36})y_{6t+}$$
$$(s_1(c_{23}a_{x36} + s_{23}c_5) + c_1a_{y36})z_{6t} +$$
$$s_1(a_1 + a_2s_2 - (a_3 - x_{36})c_{23} + z_{36}s_{23}) + c_1(d_2 - d_3 + y_6)$$
$$= s_1((c_{23}n_{x36} - s_{23}s_5c_6)x_{6t} + (c_{23}o_{x36} + s_{23}s_5s_6)y_{6t} +$$
$$(c_{23}a_{x36} + s_{23}c_5)z_{6t} + (a_1 + a_2s_2 -$$
$$(a_3 - x_{36})c_{23} + z_{36}s_{23})) +$$
$$c_1(n_{y36}x_{6t} + o_{y36}y_{6t} + a_{y36}z_{6t} + (d_2 - d_3 + y_{36}))$$

$$z_t = n_{z6}x_{6t} + o_{z6}y_{6t} + a_{z6}z_{6t} + z_6 \quad (53)$$
$$= (-s_{23}n_{x36} - c_{23}s_5c_6)x_{6t} + (-s_{23}o_{x36} + c_{23}s_5s_6)y_{6t} +$$
$$(-s_{23}a_{x36} + c_{23}c_5)z_{6t} +$$
$$(d_1 + a_2c_2 + (a_3 - x_{36})s_{23} + z_{36}c_{23})$$
$$= d_1 + a_2c_2 - (n_{x36}x_{6t} + o_{x36}y_{6t} + a_{x36}z_{6t} - (a_3 - x_{36}))s_{23} -$$
$$(s_5c_6x_{6t} - s_5s_6y_{6t} - c_5z_{6t} - z_{36})c_{23}$$

Figure 9:
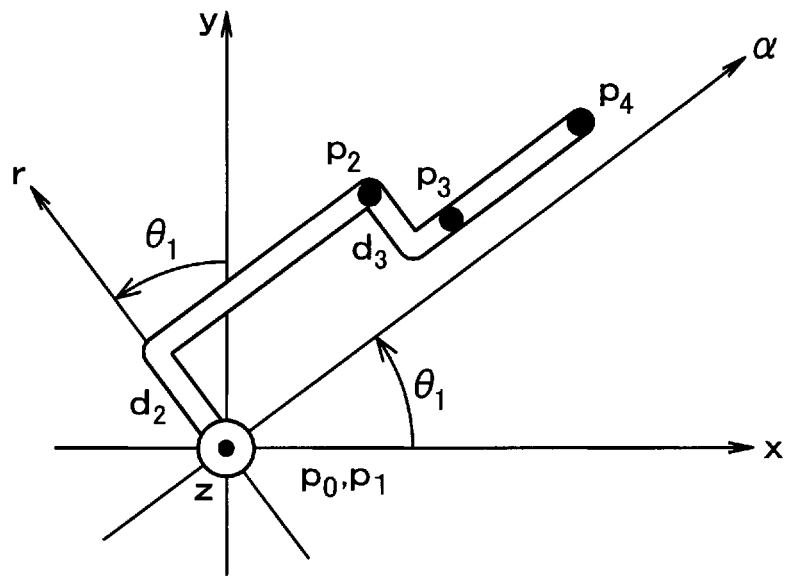
FIG. 9 is a diagram illustrating an arm mode in an x-y coordinate system and an α-r coordinate system, according to the first embodiment.
Figure 10:
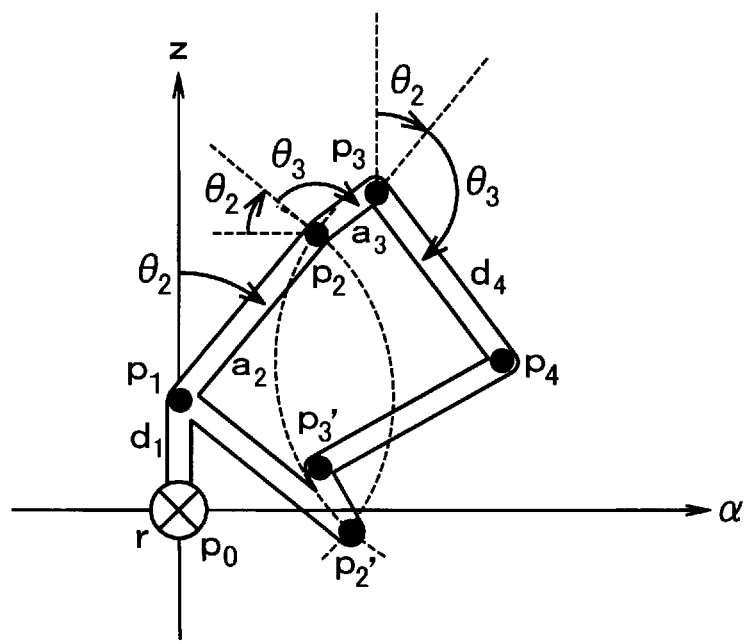
FIG. 10 is a diagram illustrating an arm mode in an α-z coordinate, according to the first embodiment.

When being into substituted into Formula (54), $x_t$ and $y_t$ are simply expressed as Formula (55) using a rotation matrix of the first axis angle. The α-r plane (α-r coordinate) used in this formula is defined, as shown in FIGS. 9 and 10, by the axes that are obtained by rotating the x and y axes by a first axis angle. Only the first axis and a twist component of the fourth axis contribute to r-direction component in the α-r plane, and the second and third axes have nothing to do with the r-direction component. Since the angles of the fourth and subsequent axes are fixed, the first axis angle can be calculated under conditions described so far.

$$r_t = n_{y36}x_{6t} + o_{y36}y_{6t} + a_{y36}z_{6t} + (d_2 - d_3 + y_{36}) \quad (54)$$
$$a_t = (c_{23}n_{x36} - s_{23}s_5c_6)x_{6t} + (c_{23}o_{x36} + s_{23}s_5s_6)y_{6t} +$$
$$(c_{23}a_{x36} + s_{23}c_5)z_{6t} + (a_1 + a_2s_2 - (a_3 - x_{36})c_{23} + z_{36}s_{23})$$

$$\begin{bmatrix} x_t \\ y_t \end{bmatrix} = \begin{bmatrix} c_1 & -s_1 \\ s_1 & c_1 \end{bmatrix} \begin{bmatrix} \alpha_t \\ r_t \end{bmatrix} \Rightarrow \begin{bmatrix} \alpha_t \\ r_t \end{bmatrix} = \begin{bmatrix} c_1 & s_1 \\ -s_1 & c_1 \end{bmatrix} \begin{bmatrix} x_t \\ y_t \end{bmatrix} \quad (55)$$
$$r_t = s_1x_t + c_1y_t$$
$$\alpha_t = c_1x_t + s_1y_t$$

$r_t$ can be calculated from Formula (54). By modifying this formula, $\alpha_t$ can be calculated as shown in Formula (56).

$$r_t^2 = s_1^2 x_t^2 - 2s_1c_1x_ty_t + c_1^2 y_t^2$$
$$\alpha_t^2 = c_1^2 x_t^2 + 2s_1c_1x_ty_t + s_1^2 y_t^2$$
$$\alpha_t^2 + r_t^2 = (s_1^2 + c_1^2)x_t^2 + (s_1^2 + c_1^2)y_t^2 = x_t^2 + y_t^2$$
$$\alpha_t = \pm\sqrt{x_t^2 + y_t^2 - r_t^2} \quad (56)$$

Subsequently, Formula (55) is devised and modified as shown in Formula (57), from which $s_1$ and $c_1$ can be calculated as trigonometric functions of the first axis angle.

$$-x_t r_t + y_t \alpha_t = s_1 x_t^2 - c_1 x_t y_t + c_1 x_t y_t + s_1 y_t^2 = s_1(x_t^2 + y_t^2) \quad (57)$$

$$s_1 = \frac{-x_t r_t + y_t \alpha_t}{(x_t^2 + y_t^2)} = \frac{-x_t r_t \pm y_t \sqrt{x_t^2 + y_t^2 - r_t^2}}{(x_t^2 + y_t^2)}$$

$$y_t r_t + x_t \alpha_t = -s_1 x_t y_t + c_1 y_t^2 + c_1 x_t^2 + s_1 x_t y_t = c_1(x_t^2 + y_t^2)$$

$$c_1 = \frac{y_t r_t + y_t \alpha_t}{(x_t^2 + y_t^2)} = \frac{y_t r_t \pm x_t \sqrt{x_t^2 + y_t^2 - r_t^2}}{(x_t^2 + y_t^2)}$$

Next, a second axis angle is calculated. As mentioned above, only the first and fourth axes contribute to the r-direction component in the α-r plane. Therefore, in the calculation from here onward, the r-direction component is ignored and only the α-direction component is taken into consideration.

$$\alpha_{1t} = \alpha_t a_1 \quad (58)$$
$$= (c_{23}n_{x36} - s_{23}s_5c_6)x_{6t} + (c_{23}o_{x36} + s_{23}s_5s_6)y_{6t} +$$
$$(c_{23}a_{x36} + s_{23}c_5)z_{6t} + (a_2s_2 - (a_3 - x_{36})c_{23} + z_{36}s_{23})$$
$$= a_2s_2 + (n_{x36}x_{6t} + o_{x36}y_{6t} + a_{x36}z_{6t} - (a_3 - x_{36}))c_{23} -$$
$$(s_5c_6x_{6t} - s_5s_6y_{6t} - c_5z_{6t} - z_{36})s_{23}$$
$$= \alpha_{12}\alpha_{2t}$$

$$z_{1t} = z_t - d_1 \quad (59)$$
$$= a_2c_2 - (n_{x36}x_{6t} + o_{x36}y_{6t} + a_{x36}z_{6t} - (a_3 - x_{36}))s_{23} -$$
$$(s_5c_6x_{6t} - s_5s_6y_{6t} - c_5z_{6t} - z_{36})c_{23}$$
$$= z_{12} + z_{2t}$$

As shown in FIG. 10, when the robot 2 is taken from the perspective of α-r plane as a side view, the following formula is established.

$$\alpha_{12} = a_2 s_2$$

$$z_{12} = a_2 c_2 \quad (60)$$

Accordingly, $z_{12}$ can be derived from the following formula.

$$\alpha_{2t} = (n_{x36}x_{6t} + o_{x36}y_{6t} + a_{x36}z_{6t} - (a_3 - x_{36}))c_{23} - \quad (61)$$
$$(s_5c_6x_{6t} - s_5s_6y_{6t} - c_5z_{6t} - z_{36})s_{23}$$
$$z_{2t} = -(n_{x36}x_{6t} + o_{x36}y_{6t} + a_{x36}z_{6t} - (a_3 - x_{36}))s_{23} -$$
$$(s_5c_6x_{6t} - s_5s_6y_{6t} - c_5z_{6t} - z_{36})c_{23}$$

$$\alpha_{12}^2 + z_{12}^2 = a_2^2 \quad (62)$$
$$\alpha_{2t}^2 + z_{2t}^2 = (n_{x36}x_{6t} + o_{x36}y_{6t} + a_{x36}z_{6t} - (a_3 - x_{36}))^2 +$$
$$(s_5c_6x_{6t} - s_5s_6y_{6t} - c_5z_{6t} - z_{36})^2$$

$$(\alpha_{1t} - \alpha_{12})^2 + (z_{1t} - z_{12})^2 = \alpha_{2t}^2 + z_{2t}^2 \quad (63)$$
$$= (n_{x36}x_{6t} + o_{x36}y_{6t} + a_{x36}z_{6t} -$$
$$(a_3 - x_{36}))^2 +$$
$$(s_5c_6x_{6t} - s_5s_6y_{6t} - c_5z_{6t} - z_{36})^2$$

$$\alpha_{1t}^2 - 2\alpha_{1t}\alpha_{12} + z_{1t}^2 - 2z_{1t}z_{12} + a_2^2 = \qquad (64)$$
$$(n_{x36}x_{6t} + o_{x36}y_{6t} + a_{x36}z_{6t} - (a_3 - x_{36}))^2 +$$
$$(s_5c_6x_{6t} - s_5s_6y_{6t} - c_5z_{6t} - z_{36})^2$$

$$\alpha_{1t}^2 + z_{1t}^2 + a_2^2 -$$
$$(n_{x36}x_{6t} + o_{x36}y_{6t} + a_{x36}z_{6t} - (a_3 - x_{36}))^2 -$$
$$z_{12} = \frac{(s_5c_6x_{6t} - s_5s_6y_{6t} - c_5z_{6t} - z_{36})^2 - 2\alpha_{1t}\alpha_{12}}{2z_{1t}}$$

Since this formula is complicated, the following substitutions may be made.

$$m_1 = n_{x36}x_{6t} + o_{x36}y_{6t} + a_{x36}z_{6t} - (a_3 - x_{36}) \qquad (65)$$

$$m_2 = s_5c_6x_{6t} - s_5s_6y_{6t} - c_5z_{6t} - z_{36} \qquad (66)$$

$$k_1 = \alpha_{1t}^2 z_{1t}^2 + a_2^2 - (n_{x36}x_{6t} + o_{x36}y_{6t} + a_{x36}z_{6t} - (a_3 - x_{36}))^2 - \qquad (67)$$
$$(s_5c_6x_{6t} - s_5s_6y_{6t} - c_5z_{6t} - z_{36})^2$$
$$= \alpha_{1t}^2 z_{1t}^2 + a_2^2 - m_1^2 - m_2^2$$

$$z_{12} = \frac{k_1 - 2\alpha_{1t}\alpha_{12}}{2z_{1t}} \qquad (68)$$

$z_{12}$ is deleted and solved for $\alpha_{12}$. Formula (68) is substituted into Formula (62) for formation into a quadratic equation and then $\alpha_{12}$ is calculated using a quadratic formula.

$$\alpha_{12}^2 + \left(\frac{k_1 - 2\alpha_{1t}\alpha_{12}}{2z_{1t}}\right)^2 = a_2^2 \qquad (69)$$

$$4z_{1t}^2 \alpha_{12}^2 + k_1^2 - 4\alpha_{1t}k_1\alpha_{12} + 4\alpha_{1t}^2 \alpha_{12}^2 = 4z_{1t}^2 a_2^2 \qquad (70)$$
$$4(z_{1t}^2 + \alpha_{1t}^2)\alpha_{12}^2 - 4\alpha_{1t}k_1\alpha_{12} + k_1^2 - 4z_{1t}^2 a_2^2 = 0$$

$$\alpha_{12} = \frac{2\alpha_{1t}k_1 \pm \sqrt{4\alpha_{1t}^2 k_1^2 - 4(z_{1t}^2 + \alpha_{1t}^2)(k_1^2 - 4z_{1t}^2 a_2^2)}}{4(z_{1t}^2 + \alpha_{1t}^2)} \qquad (71)$$

$$4\alpha_{1t}^2 k_1^2 - 4(z_{1t}^2 + \alpha_{1t}^2)(k_1^2 - 4z_{1t}^2 a_2^2) = 4z_{1t}^2(-k_1^2 + 4(z_{1t}^2 + \alpha_{1t}^2)a_2^2) \qquad (72)$$

$$k_2 = 4(z_{1t}^2 + \alpha_{1t}^2)a_2^2 - k_1^2 \qquad (73)$$

$$\alpha_{12} = \frac{\alpha_{1t}k_1 \pm |z_{1t}|\sqrt{k_2}}{2(z_{1t}^2 + \alpha_{1t}^2)} \qquad (74)$$

When $K_2 < 0$ is satisfied, there is no solution because the arm tip is not within reach of a specific position. $z_{12}$ can be similarly calculated by solving Formula (64) and the subsequent formulas for $z_{12}$ by deleting $\alpha_{12}$, or alternatively, by substituting Formula (74) into Formula (68).

$$z_{12} = \frac{k_1 - 2\alpha_{1t}\frac{\alpha_{1t}k_1 \pm |z_{1t}|\sqrt{k_2}}{2(z_{1t}^2 + \alpha_{1t}^2)}}{2z_{1t}} \qquad (75)$$

$$z_{12} = \frac{z_{1t}k_1 \pm |\alpha_{1t}|\sqrt{k_2}}{2(z_{1t}^2 + \alpha_{1t}^2)} \qquad (76)$$

$$\alpha_{12} = \frac{\alpha_{1t}k_1 \mp z_{1t}\sqrt{k_2}}{2(z_{1t}^2 + \alpha_{1t}^2)} \qquad (77)$$

$$z_{12} = \frac{z_{1t}k_1 \pm \alpha_{1t}\sqrt{k_2}}{2(z_{1t}^2 + \alpha_{1t}^2)} \qquad (78)$$

$$s_2 = \frac{\alpha_{12}}{a_2} \qquad (79)$$

$$c_2 = \frac{z_{12}}{a_2} \qquad (80)$$

Finally, the third axis angle is calculated. By modifying Formulas (61), (65) and (66), $c_{23}$ and $s_{23}$ can be calculated. If Formula (84) is used, the angles of the first, second and third axes can be calculated. In this case, n indicates an angle that is a sum of the angles of an axis having an ordinal number and the second and third axes.

$$\alpha_{2t} = (n_{x36}x_{6t} + o_{x36}y_{6t} + a_{x36}z_{6t} - (a_3 - x_{36}))c_{23} - \qquad (81)$$
$$(s_5c_6x_{6t} - s_5s_6y_{6t} - c_5z_{6t} - z_{36})s_{23}$$
$$= m_1 c_{23} - m_2 s_{23}$$

$$z_{2t} = -(n_{x36}x_{6t} + o_{x36}y_{6t} + a_{x36}z_{6t} - (a_3 - x_{36}))s_{23} -$$
$$(s_5c_6x_{6t} - s_5s_6y_{6t} - c_5z_{6t} - z_{36})c_{23}$$
$$= -m_1 s_{23} - m_2 c_{23}$$

$$m_1\alpha_{2t} + m_2 z_{2t} = c_{23}(m_1^2 - m_2^2) \qquad (82)$$

$$c_{23} = \frac{m_1\alpha_{2t} - m_2 z_{2t}}{m_1^2 + m_2^2} = \frac{m_1\alpha_{2t} - m_2 z_{2t}}{\alpha_{2t}^2 + z_{2t}^2} - m_2\alpha_{2t} - m_1 z_{2t} = s_{23}(m_1^2 + m_2^2)$$
$$(83)$$

$$s_{23} = -\frac{m_2\alpha_{2t} + m_1 z_{2t}}{m_1^2 + m_2^2} = -\frac{m_2\alpha_{2t} + m_1 z_{2t}}{\alpha_{2t}^2 + z_{2t}^2}$$

$$\theta_n = \operatorname{atan}(s_n, c_n) \qquad (84)$$

The inverse transform calculation described above is used for the robot 2 of the present embodiment in which the wrist offset $d_5$ is not zero ($d_5 \neq 0$), but can also be applied to generally used PUMA six-axis robots in which the wrist portion has no offset ($d_5 = 0$). If the wrist offset $d_5$ is zero, the inverse transform calculation can be similarly performed by substituting $d_5 = 0$ into Formula (45) and performing subsequent calculations.

As described above, the following advantageous effects can be achieved by the present embodiment.

In direct teaching in which the arm tip position is changed while the arm tip posture is retained at a target posture, the controller 3 sets the first, second and third axes as being operation axes which are permitted to freely move according to an external force. At the same time, the controller 3 sets the fourth, fifth and sixth axes as being control axes which are to be controlled by the controller 3. Then, when this direct teaching is performed, the controller 3 receives inputs of current angles of the operation axes and a target posture to calculate command angles of the respective control axes based on inverse kinematics calculation.

With this configuration, since the operation axes are freely moved according to the user's operation (i.e., by the user holding the robot), the arm tip position can be changed as desired by the user. In this case, command angles for the control axes are ensured to be calculated based on the current angles of the operation axes, which are moved according to the user's operation, and the target posture of the arm tip. Accordingly, the arm tip posture can be retained at the target posture.

In this way, with the above configuration, the user can change the arm tip position while keeping the arm tip posture at a target posture, or in other words, can perform direct teaching by constraining the arm tip posture, without requiring particularly difficult operation. Thus, the present embodiment can present great advantageous effects of simplifying adjustment and operation of the arm tip position and posture of the robot 2 in direct teaching.

In direct teaching in which the arm tip posture is changed while the arm tip position is retained at a target position, the controller 3 sets the fourth, fifth and sixth axes as being operation axes which are permitted to freely move according to an external force. At the same time, the controller 3 sets the first, second and third axes as being control axes which are to be controlled by the controller 3. Then, when this direct teaching is performed, the controller 3 receives inputs of current angles of the operation axes and a target position to calculate command angles of the control axes based on inverse kinematics calculation.

With this configuration, since the operation axes are freely moved according to the user's operation (i.e., by the user holding the robot), the arm tip posture can be changed as desired by the user. In this case, command angles for the control axes are ensured to be calculated based on the current angles of the operation axes which are moved according to the user's operation, and the target position of the arm tip. Accordingly, the arm tip position can be retained at the target position.

In this way, with the above configuration, the user can change the arm tip posture while keeping the arm tip position at a target position, or in other words, can perform direct teaching by constraining the arm tip position, without requiring particularly difficult operation. Thus, the present embodiment can present great advantageous effects of simplifying adjustment and operation for the arm tip position and posture of the robot 2 in direct teaching.

Furthermore, according to the present embodiment, angle control is performed such that the arm tip posture or position can agree with a target posture or position by using only the axes, over which angle control is effective, according to the current angles of the axes which can be freely operated. This achieves an advantageous effect that unstable movement, such as vibration, is unlikely to occur. Furthermore, with the above configuration, direct teaching constraining the arm tip posture is ensured to be realized by using an angle control system originally provided to the controller 3 of the robot 2, without using a sensor, such as a force sensor or a torque sensor. This configuration can also contribute to reducing manufacturing cost.

The advantageous effects achieved by the present embodiment may become prominent even more when compared to the conventional art. In this regard, the technique disclosed in the patent document JP S60-233707 A mentioned at the beginning is taken to be a comparative example to explain superiority of the present embodiment to this comparative example. Referring to FIGS. 11 and 12, this superiority will be described. It should be noted that, in FIGS. 11A to 11D and 12A to 12C, direct teaching constraining the arm tip posture is assumed. Accordingly, the first, second and third axes ($J_1$, $J_2$ and $J_3$) are set as being axes which are freely movable according to an external force (corresponding to the operation axes), while the fourth, fifth and sixth axes ($J_4$, $J_5$ and $J_6$) are set as being axes whose positions are controllable (corresponding to the control axes).

First, in an initial posture shown in FIG. 11A, the user may operate the robot so as to fold the second and third axes ($J_2$ and $J_3$). Then, the robot is brought into a state shown in FIG. 11B in which the arm tip posture is offset from the initial posture that is a target posture. In the comparative example, in this case, only the posture is overwritten, with the position remained unchanged, followed by inverse transform. Therefore, the robot is brought into a state indicated by the solid lines in FIG. 11C.

In the comparative example, the arm tip posture is desired to be retained at the initial posture by operating the second and fifth axes ($J_2$ and $J_5$), as indicated by the broken lines in FIG. 11C, according to the result of the inverse transform. However, since the second axis ($J_2$), which is an operation axis, cannot be operated, and thus only the fifth axis ($J_5$) may move. Consequently, as shown by the solid lines in FIG. 11C, the arm tip posture may unavoidably become different from the initial posture.

In the subsequent steps of the comparative example, only the posture is overwritten for inverse transform, with the position remained unchanged. Therefore, the robot may be brought into a state as indicated by the solid lines in FIG. 11D. In the comparative example, the arm tip posture is desired to be retained at the initial posture by operating the second and fifth axes ($J_2$ and $J_5$), as indicated by the broken lines in FIG. 11D, according to the result of the inverse transform. However, since the second axis ($J_2$), which is an operation axis, cannot be operated, and thus only the fifth axis ($J_5$) may move. Consequently, as indicated by the solid lines in FIG. 11D, the arm tip posture may unavoidably become different from the initial posture.

Thus, the arm tip posture cannot be retained at the initial posture in the comparative example due to iteration of such movement. In this regard, in the present embodiment, only the fourth, fifth and sixth axes, i.e., control axes, over which angle control is effective, are controlled in terms of angle according to the current angles of the operation axes such that the arm tip posture agrees with the initial posture, i.e., the target posture. Accordingly, as indicated by the dash-dot lines in FIG. 11D, the arm tip posture can be retained at the initial posture by operating only the fifth axis ($J_5$).

In an initial posture shown in FIG. 12A, when an operation of expanding the second and third axes is performed by the user, the robot will be brought into a state shown in FIG. 12B, with the arm tip posture being offset from the initial posture, i.e., the target posture. In this case as well, inverse transform is attempted in the comparative example by overwriting only the posture, with the position remained unchanged. However, as indicated by the broken lines in FIG. 12C, inverse transform cannot be performed because the arm tip is not within reach of a specific position.

Accordingly, as shown in FIGS. 12B and 12C, the arm tip posture cannot be retained at the initial posture in the comparative example. In this regard, in the present embodiment, only the fourth, fifth and sixth axes, i.e., control axes, over which angle control is effective, are controlled in terms of angle according to the current angles of the operation axes such that the arm tip posture agrees with the initial posture, i.e., the target posture. Accordingly, as indicated by the dash-dot lines in FIG. 12C, the arm tip posture can be retained at the initial posture by operating only the fifth axis ($J_5$).

In the comparative example, as in the two cases described above, command values commanding great movement of the operation axes may be outputted as a result of the operation axes being greatly moved. In this case, however, since only the control axes are operable, retaining posture would be difficult because the error is not converged forever. In the comparative example, the existing inverse transform can be directly used, however, a precise solution is not obtained by one inverse transform, but a solution gradually converges and this gradual convergence is reflected accordingly to the robot motion. Thus, the time of convergence is unclear as in the two cases described above. Therefore, the behavior of the robot cannot be guaranteed at all before convergence of a solution.

Furthermore, in the comparative example, solution may become unstable near the singular point of the robot and may change extremely, raising an issue of safety. Also, in the comparative example, each axis angle has a plurality of solutions for a target position and posture, and how selection should be made for these solutions is ambiguous. Specifically, in the comparative example, the way of selecting mode is ambiguous, and forcible mode change may allow the solution to cross a singular point and change extremely.

In this way, the comparative example raises not only an issue that the arm tip position or posture is not necessarily retained, but also an issue of safety. In this regard, in the present embodiment, precise target values of control axes are ensured to be calculated, leaving target values other than for the position or posture unknown. Therefore, while safety is retained sufficiently, the arm tip position or posture can be reliably retained in the present embodiment, which is lost in the comparative example.

With the above configuration, the axes are divided into two groups, one being base side axes which are the three axes continuing from the base 4, i.e., the first, second and third axes, and the other being tip side axes which are the three axes continuing from the arm tip, i.e., the fourth, fifth and sixth axes. Accordingly, when the user attempts to teach a posture to a robot by constraining the arm tip position of the robot, the three axes continuing from the tip can be operated by the user's force. Thus, the operation desired by the user (the operation of moving the axes near the tip for adjusting the arm tip posture) may be easily reflected to the actual operation.

Also, when the user attempts to teach a position to the robot by constraining the arm tip posture, the three axes continuing from the base 4 can be operated by the user's force. Thus, the operation desired by the user (the operation of moving the axes near the base 4 for adjusting the arm tip position) may be easily reflected to the actual operation. In this way, division of the axes into two groups can achieve advantageous effects that the user may be less likely to feel uneasiness during direct teaching.

Second Embodiment

Referring now to FIGS. 13 to 18, a second embodiment will be described. The second embodiment is different from the first embodiment in the control of the controller 3, i.e., in the method of controlling the robot 2.

In the first embodiment, when the robot 2 passes near a singular point during direct teaching or when the operation axes are operated suddenly, variation in command angles of the control axes may become excessively large. In such a case, the control axes may abruptly move and safety may be deteriorated.

Figure 13:
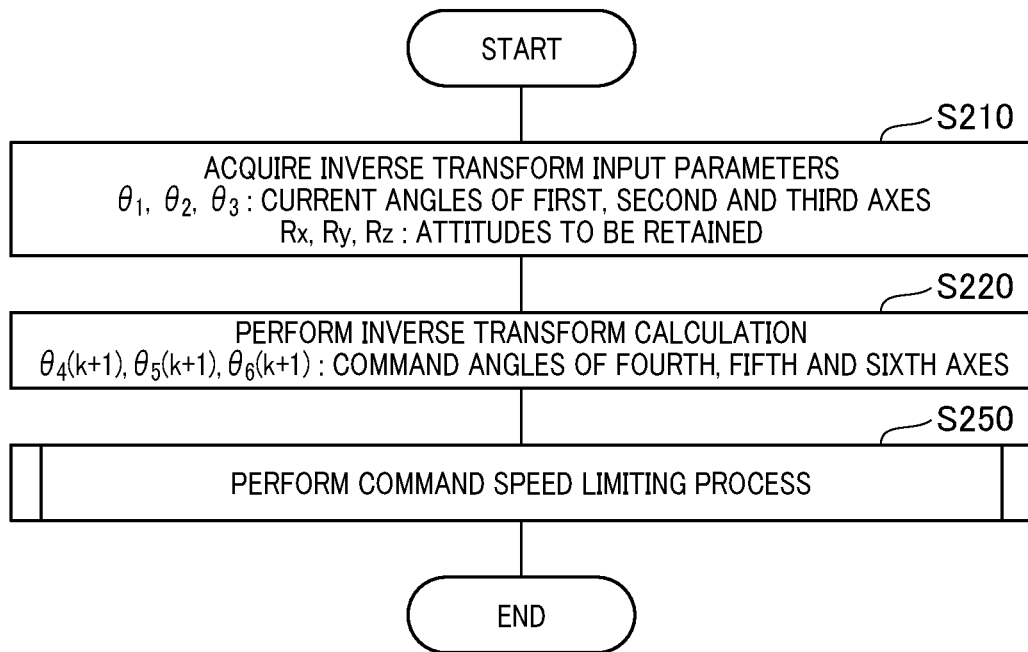
FIG. 13 is a flow diagram illustrating a first command calculation process, according to a second embodiment of the present disclosure.
Figure 14:
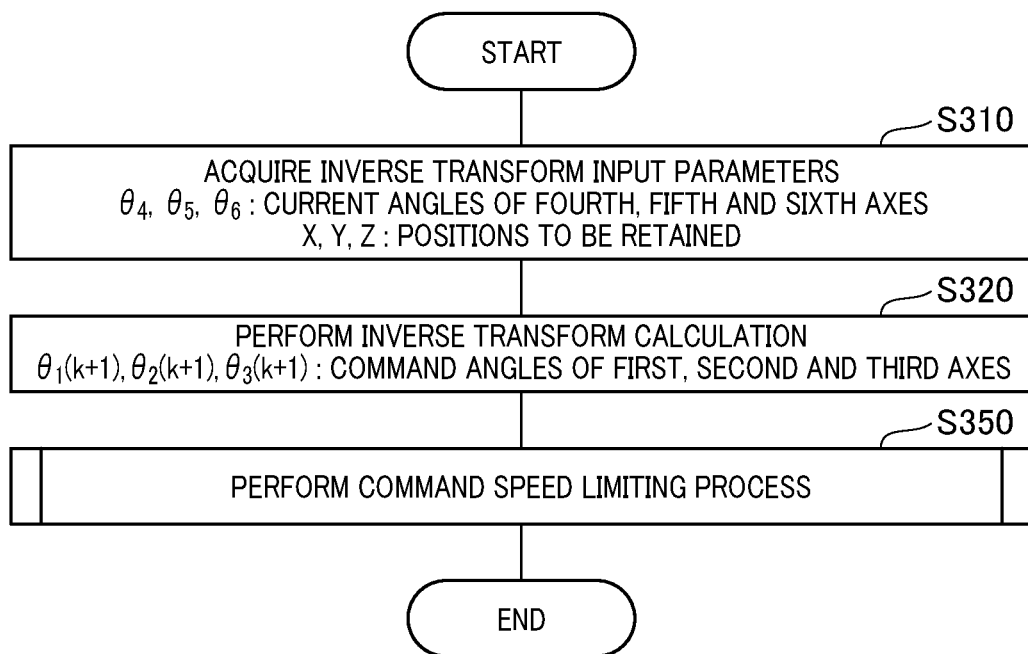
FIG. 14 is a flow diagram illustrating a second command calculation process, according to the second embodiment.

In this regard, in the present embodiment, the first command calculation process and the second command calculation process, which are executed by the controller 3 functioning as an angle control section, are modified to improve the issue of safety deterioration. For example, the first command calculation process of the present embodiment is as shown in FIG. 13. In this case, after executing step S220, control proceeds to step S250 where the controller 3 executes a command speed limiting process. Also, for example, the second command calculation process of the present embodiment is as shown in FIG. 14. In this case, after executing step S320, control proceeds to step S350 where the controller 3 executes a command speed limiting process.

The command speed limiting process is summarized as follows. First, a maximum angular velocity $\omega_{max}$ and a maximum angular acceleration $a_{max}$, which the user determines to be safe, are determined in advance for each joint (each axis). As a method of determining these parameters ($\omega_{max}$ and $a_{max}$), there may be a method of tuning the behavior of the robot 2 while the actual behavior is being confirmed by the user, or other methods. When a command angle $\theta(k+1)$ of each control axis is calculated, the controller 3 executes an acceleration correction process and a deceleration correction process. In the acceleration correction process, the command angle $\theta(k+1)$ of each joint is corrected to a command angle $\theta(k+1)'$ so that the control axis is safely accelerated at the command angle $\theta(k+1)$. In the deceleration correction process, the command angle $\theta(k+1)'$ is corrected to a command angle $\theta(k+1)''$ so that the control axis is decelerated and the angle thereof finally converges to the original command angle $\theta(k+1)$.

Specifically, when a command angle $\theta(k+1)$ of each control axis is calculated, the controller 3 performs the acceleration correction process. In this process, the controller 3 calculates a command angular velocity $\omega(k+1)$ and a command angular acceleration $a(k+1)$ based on the command angle $\theta(k+1)$, and corrects the command angle $\theta(k+1)$ so that the command angular velocity $\omega(k+1)$ and the command angular acceleration $a(k+1)$ do not respectively exceed the predetermined maximum angular velocity $\omega_{max}$ and the maximum angular acceleration $a_{max}$. As a result of this processing, a safe command angle $\theta(k+1)'$ is produced, with which the angular velocity and the angular acceleration of the control axis are respectively permitted to be equal to or less than the maximum angular velocity $\omega_{max}$ and the maximum angular acceleration $a_{max}$.

However, there may be the case where the angle of the control axis may exceed the initially calculated command angle $\theta(k+1)$ even when the control axis is maximally decelerated from the command angle $\theta(k+1)'$ corrected through the acceleration correction process. Therefore, the controller 3 performs the deceleration process. In this process, the controller 3 further corrects the command angle $\theta(k+1)'$ corrected through the acceleration correction process so that the angle of the control axis converges to the initially calculated command angle $\theta(k+1)$. Thus, the angle of the control axis is prevented from exceeding the initially calculated command angle $\theta(k+1)$.

Figure 15:
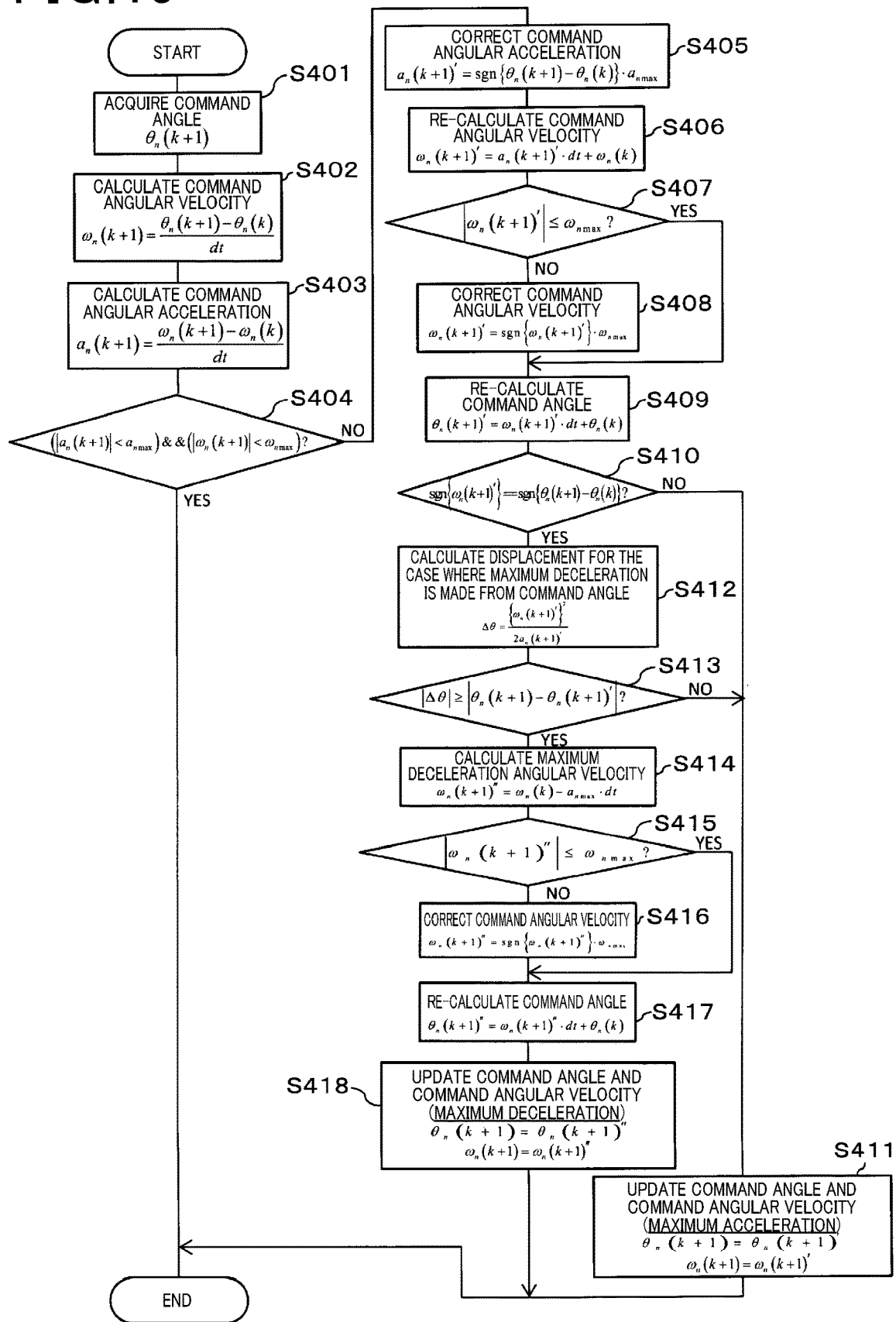
FIG. 15 is a flow diagram illustrating a command speed limiting process, according to the second embodiment.

For example, the command speed limiting process in this case is specifically as shown in FIG. 15. Symbols used in the following explanation are defined as follows. In the following definition n indicates an ordinal number of the axis.

$\theta_n(k)$: Previous command angle
$\theta_n(k+1)$: Command angle
$\theta_n(k+1)'$: Command angle (maximum acceleration)
$\theta_n(k+1)''$: Command angle (maximum deceleration)
$\omega_n(k)$: Previous command angular velocity
$\omega_n(k+1)$: Command angular velocity
$\omega_n(k+1)'$: Command angular velocity (maximum acceleration)
$\omega_n(k+1)''$: Command angular velocity (maximum deceleration)
$a_n(k+1)$: Command angular acceleration
$a_n(k+1)^1$: Command angular acceleration (maximum acceleration)

First, at step S401, a command angle $\theta_n(k+1)$ is acquired. At step S402, a command angular velocity $\omega_n(k+1)$ is calculated based on the following Formula (85).

$$\omega_n(k+1)=\{\theta_n(k+1)-\theta_n(k)\}/dt \quad (85)$$

At step S403, a command angle acceleration is calculated based on the following Formula (86).

$$a_n(k+1)=\{\omega_n(k+1)-\omega_n(k)\}/dt \quad (86)$$

At step S404, it is determined whether the requirement of the command angular velocity $\omega_n(k+1)$ calculated at step S402 being less than the maximum angular velocity $\omega_{nmax}$ and the requirement of the command angular acceleration $a_n(k+1)$ calculated at step S403 being less than the maximum angular acceleration $a_{nmax}$ are both satisfied. In other words, it is determined whether the following Formulas (87) and (88) are both satisfied.

$$|\omega_n(k+1)|<\omega_{nmax} \quad (87)$$

$$|a_n(k+1)|<a_{nmax} \quad (88)$$

If Formulas (87) and (88) are both satisfied, the determination made at step S404 will be "YES" and the command speed limiting process is terminated. Specifically, in this case, since no speed limiting is required, the angle of the control axis is controlled based on the initial command angle $\theta_n(k+1)$. If either or both of Formulas (87) and (88) are not satisfied, the determination made at step S404 will be "NO" and control proceeds to step S405.

At step S405, the command angular acceleration is corrected based on the following Formula (89). In this formula, a symbol sgn indicates a function that returns the sign of the calculation result of the formula in the subsequent braces.

$$a_n(k+1)'=\text{sgn}\{\theta_n(k+1)-\theta_n(k)\}\cdot a_{nmax} \quad (89)$$

Thus, at step S405, the command angular acceleration is replaced by the maximum angular acceleration $a_{nmax}$ (a maximum value is pasted to an angular acceleration). In this case, an acceleration direction is calculated from a positional deviation.

At step S406, a command angular velocity is re-calculated based on the following Formula (90). Specifically, at step S406, a command angular velocity $\omega_n(k+1)'$ in the case of the control axis being accelerated at the maximum angular acceleration $a_{nmax}$ is calculated.

$$\omega_n(k+1)'=a_n(k+1)'\cdot dt+\omega_n(k) \quad (90)$$

At step S407, it is determined whether the command angular velocity $\omega_n(k+1)'$ re-calculated at step S406 is equal to or less than the maximum angular velocity $\omega_{nmax}$, i.e., whether the following Formula (91) is satisfied.

$$|\omega_n(k+1)'|\leq\omega_{nmax} \quad (91)$$

If the command angular velocity $\omega_n(k+1)'$ is equal to or less than the maximum angular velocity $\omega_{nmax}$, the determination made at step S407 will be "YES" and control proceeds to step S409 without executing step S408. If the command angular velocity $\omega_n(k+1)'$ exceeds the maximum angular velocity $\omega_{nmax}$, the determination made at step S407 will be "NO" and control proceeds to step S408. At step S408, the command angular velocity is corrected based on the following Formula (92).

$$\omega_n(k+1)'=\text{sgn}\{\omega_n(k+1)'\}\cdot\omega_{nmax} \quad (92)$$

Thus, at step S408, the command angular velocity is replaced by the maximum angular velocity $\omega_{nmax}$ (the maximum value is given to the angular velocity).

At step S409, a command angle is re-calculated based on the following Formula (93). Specifically, at step S409, a command angle $\theta_n(k+1)'$ in the case of the control axis being accelerated at the maximum angular acceleration $a_{nmax}$ is calculated.

$$\theta_n(k+1)'=\omega_n(k+1)'\cdot dt+\theta_n(k) \quad (93)$$

Since the command angle dynamically varies according to the user's operation of the control axis, the command angle may approach the current angle. In this case, deceleration may be behind the rate of variation and accordingly the direction of the command angular velocity may be reverse of the direction from the current angle toward the command angle. Therefore, at step S410, it is determined whether the following Formula (94) is satisfied. Specifically, at step S410, a direction toward the command angle (the right side of the following formula) is found from the sign of the positional deviation, and it is determined whether this direction agrees with the direction of the command angular velocity $\omega_n(k+1)'$ (the left side of the following formula).

$$\text{sgn}\{\omega_n(k-1)'\}=\text{sgn}\{\theta_n(k+1)-\theta_n(k)\} \quad (94)$$

If Formula (94) is not satisfied, the determination made at step S410 will be "NO" and then control proceeds to step S411. In this case, the axis may be away from the command angle. Therefore, at step S411, the command angle is updated to $\theta_n(k+1)'$ and the command angular velocity is updated to $\omega_n(k+1)'$ so that the control axis is maximally accelerated toward the command angle at step S411. After executing step S411, the command speed limiting process is terminated.

If Formula (94) is satisfied, the determination made at step S410 will be "YES" and then control proceeds to step S412. In this case, it is required to confirm whether deceleration can catch up with the rate of variation. Therefore, at step S412, a displacement 40 in the case of the control axis being maximally decelerated from the command angle is calculated based on the following Formula (95).

$$\Delta\theta=\{\omega_n(k+1)'\}^2/\{2a_n(k+1)'\} \quad (95)$$

At step S143, it is determined whether the remaining distance to the command angle (the right side of the following formula) is equal to or less than a distance required for deceleration to a stop (the left side of the following formula).

$$|\Delta\theta|\geq|\theta_n(k+1)-\theta_n(k+1)'| \quad (96)$$

If the right side of Formula (96) is larger than the left side thereof, the determination made at step S413 will be "NO" and then control returns to step S411. In this case, since the deceleration distance is sufficient, the command angle and the command angular velocity are updated, so that the control axis can be maximally accelerated, at step S411, toward the command angle. If the right side of Formula (96) is equal to or less than the left side thereof, the determination made at step S413 will be "YES" and then control proceeds to step S414.

In this case, the angle of the control axis may exceed the command angle if the control axis is maximally decelerated from the position where it has been moved. Specifically, in this case, if the control axis is continuously accelerated, the angle of the control axis may exceed the command angle, and therefore, deceleration is required to be immediately started. Accordingly, at step S414, a maximum deceleration rate is calculated based on the following Formula (97).

$$\omega_n(k+1)''=\omega_n(k)-a_{nmax}\cdot dt \quad (97)$$

At step S415, it is determined whether the command angular velocity $\omega_n(k+1)''$ re-calculated at step S414 is equal to or less than the maximum angular velocity $\omega_{nmax}$, i.e., whether the re-calculated command angular velocity satisfies the following Formula (98).

$$|\omega_n(k+1)''| \leq \omega_{nmax} \tag{98}$$

If the command angular velocity $\omega_n(k+1)''$ is equal to or less than the maximum angular velocity $\omega_{nmax}$, the determination made at step S415 will be "YES" and then control proceeds to step S417 without executing step S416. If the command angular velocity $\omega_n(k+1)''$ exceeds the maximum angular velocity $\omega_{nmax}$, the determination made at step S415 will be "NO" and control proceeds to step S416. At step S416, the command angular velocity is corrected based on the following Formula (99).

$$\omega_n(k+1)'' = \text{sgn}\{\omega_n(k+1)''\} \cdot \omega_{nmax} \tag{99}$$

Thus, at step S416, the command angular velocity is replaced by the maximum angular velocity $\omega_{nmax}$ (the maximum value is pasted to the angular velocity).

At step S417, a command angle is re-calculated based on the following Formula (100).

$$\theta_n(k+1)'' = \omega_n(k+1)'' \cdot dt + \theta_n(k) \tag{100}$$

At step S418, the command angle is updated to $\theta_n(k+1)''$ and the command angular velocity is updated to $\omega_n(k+1)''$ so that the control axis is maximally decelerated. After executing step S418, the command speed limiting process is terminated.

Figure 16A:
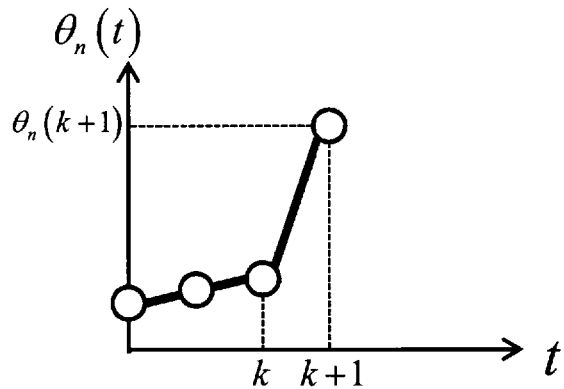
FIGS. 16A to 16F are diagrams each illustrating correction of a command during direct teaching, according to the second embodiment.

Referring to FIGS. 16A to 16F, 17A to 17C and 18, the following description explains an example of how each command value (command angle $\theta_n(t)$, command angular velocity $\omega_n(t)$ or command angular acceleration $a_n(t)$) is corrected by executing the command speed limiting process during direct teaching. The following description is based on an assumption that, as shown in FIG. 16A, a command angle $\theta_n(k+1)$ given in the current iteration (time k+1) has a value greatly varying from the command angle $\theta_n(k)$ of the previous iteration (time k).

Figure 16F:
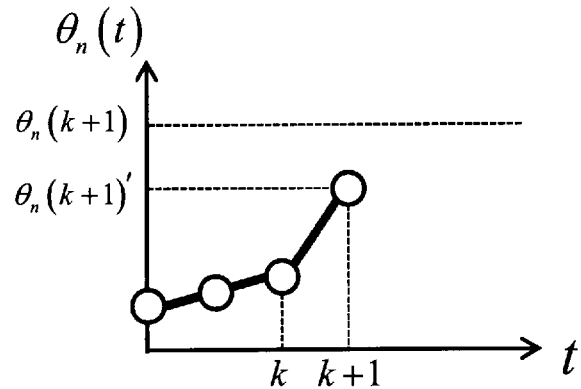
Figure 16B:
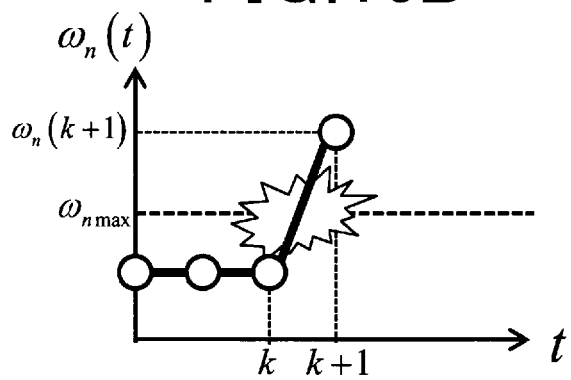
Figure 16E:
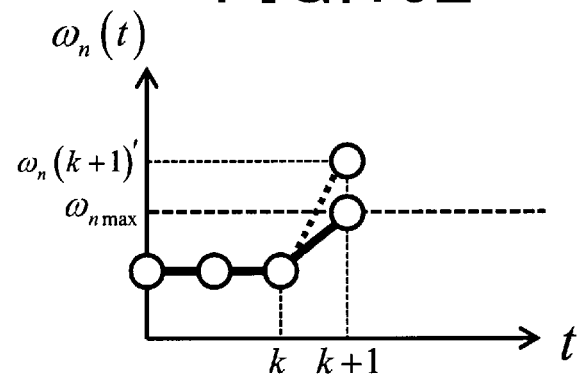
Figure 16C:
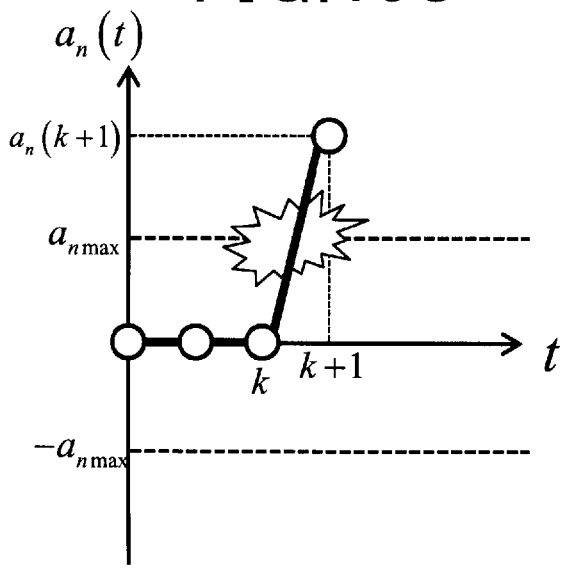
Figure 16D:
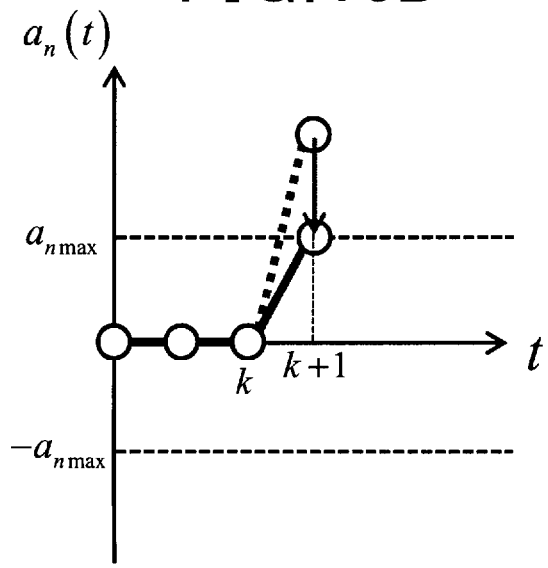

As shown in FIGS. 16B and 16C, the command angular velocity $\omega_n(k+1)$ and the command angular acceleration $a_n(k+1)$ calculated based on the command angle $\theta_n(k+1)$ respectively have values exceeding the maximum angular velocity $\omega_{nmax}$ and the maximum angular acceleration $a_{nmax}$. Thus, as shown in FIG. 16D, the command angular acceleration $a_n(t)$ is limited to the maximum angular acceleration $a_{nmax}$. Then, a command angular velocity $\omega_n(t)$ is re-calculated based on the command angular acceleration $a_n(t)$ limited in this way. As shown in FIG. 16E, if the re-calculated command angular velocity $\omega_n(k+1)'$ exceeds the maximum angular velocity $\omega_{nmax}$, the command angular velocity $\omega_n(t)$ is limited to the maximum angular velocity $\omega_{nmax}$.

After that, a command angle $\theta_n(t)$ is re-calculated based on the command angular velocity $\omega_n(k+1)$ that has been limited in this way. Thus, a command angle $\theta_n(k+1)'$ as shown in FIG. 16F is produced. The command angle $\theta_n(k+1)'$ is a safe command value that allows the angular velocity and the angular acceleration to be equal to or less than the maximum values. The processing so far corresponds to the acceleration correction process. As described above, in the acceleration correction process, an angular velocity and an angular acceleration are calculated from a given command angle to check against limits and the angular velocity and the angular acceleration are limited to obtain a corrected safe command angle.

Figure 17A:
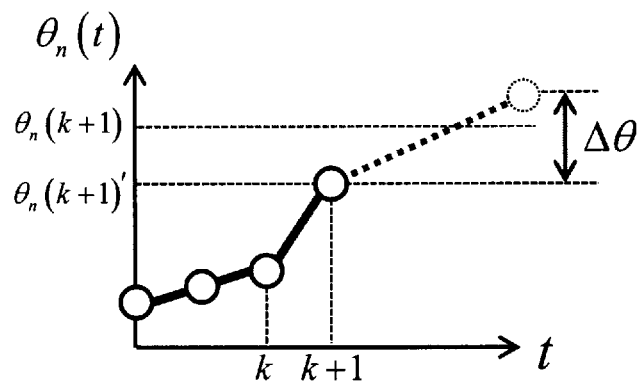
FIGS. 17A to 17C are diagrams each illustrating correction of a command during direct teaching, according to the second embodiment.

Then, as shown in FIG. 17A, a distance 40 required for deceleration stop is calculated based on the initial speed (=command angular velocity $\omega_n(k+1)'$) and the maximum angular acceleration $a_{nmax}$ to check if the calculated value exceeds the original command angle $\theta_n(k+1)$. In this case, as indicated by the broken line in FIG. 17A, if the control axis is continuously accelerated, deceleration may lag behind the rate of acceleration and the angle of the control axis may exceed the original command angle $\theta_n(k+1)$.

Figure 17B:
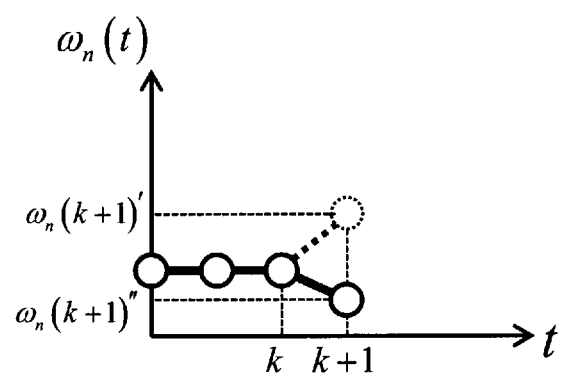
Figure 17C:
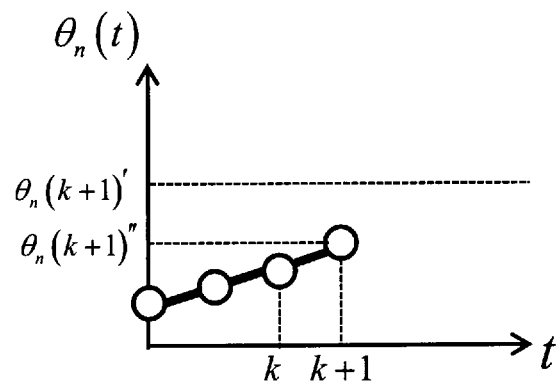

Therefore, as shown in FIG. 17B, the command angular velocity $\omega_n(t)$ is started to be lowered to immediately start deceleration. Specifically, as shown in FIG. 17C, the command angle $\theta_n(t)$ is corrected to a command angle $\theta_n(k+1)''$ which can maximally decelerate the command angular acceleration $a_n(t)$ as $-a_{nmax}$. The processing so far corresponds to the deceleration correction process. As described above, in the deceleration correction process, the command value after acceleration correction is used as a basis to check whether deceleration to a stop can be performed without delay with the original command angle. If the deceleration to a stop cannot be performed without delay with the original command angle, the angle is corrected to a command angle with which deceleration can be immediately started.

Figure 18:
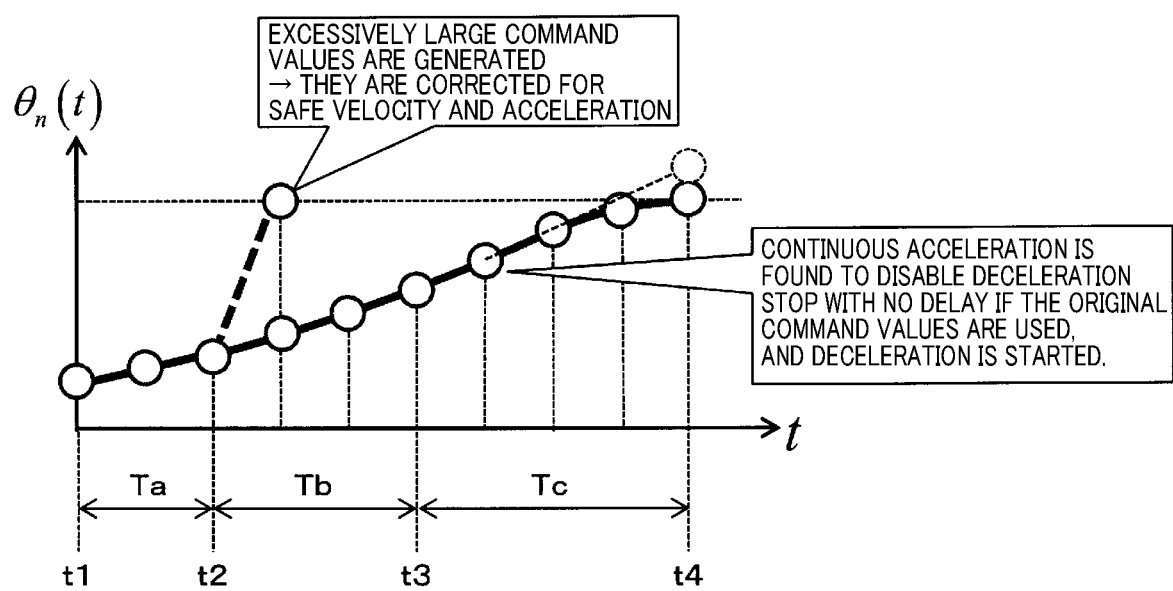
FIG. 18 is a diagram illustrating variation of a command angle due to execution of processes, according to the second embodiment.

The entire process is as shown in FIG. 18. Specifically, FIG. 18 shows variation of the command angle $\theta_n(t)$ as a result of executing the processes described above. In FIG. 18, the period Ta between times t1 and t2 is a period in which speed is not limited, the period Tb between times t2 and t3 is a period in which acceleration is corrected, and the period Tc between times t3 and t4 is a period in which deceleration is corrected.

As shown in FIG. 18, when the command value (command angle) greatly varying from the previous value is generated at time t2, the command value is corrected so that safe angular velocity and angular acceleration can be achieved during the period Tb. After that, if deceleration stop is found not to be performed without delay during the period Tc with the original command angle, the command angle is corrected so that deceleration is started. Consequently, if variation in command angle becomes great, the control axis can reach the command angle with safe angular velocity and angular acceleration.

As described above, when a command angle $\theta_n(k+1)$ of a control axis has been calculated, the controller 3 of the present embodiment performs the acceleration correction process in which the command angle is corrected such that a command angular velocity $\omega_n(k+1)$ and a command angular acceleration $a_n(k+1)$ of the control axis calculated based on the command angle do not respectively exceed the maximum angular velocity $\omega_{nmax}$ and the maximum angular acceleration $a_{nmax}$. Thus, a safe command angle $\theta_n(k+1)'$ is produced, with which the angular velocity and the angular acceleration of the control axis are respectively permitted to be equal to or less than the maximum angular velocity $\omega_{nmax}$ and the maximum angular acceleration $a_{nmax}$.

However, there may be the case where the angle of the control axis may exceed the initially calculated command angle $\theta(k+1)$ even when the control axis is maximally decelerated from the command angle $\theta(k+1)'$ corrected through the acceleration correction process. To cope with this, the controller 3 further performs the deceleration correction process in which the command angle $\theta(k+1)'$ is further corrected such that the angle of the control axis converges to the initially calculated command angle $\theta(k+1)$. Thus, the angle of the control axis is prevented from exceeding the command angle $\theta(k+1)$.

In this way, the angle of the control axis is permitted to accurately reach the initially calculated θ(k+1), while the angular velocity and the angular acceleration of the control axis are respectively permitted to be not more than the maximum angular velocity $\omega_{nmax}$ and the maximum angular acceleration $a_{nmax}$, even when the robot 2 passes near a singular point, or variation in the command angle θ(k+1) of the control axis becomes excessively large due to abrupt operation of the operation axis during direct teaching.

When the acceleration correction process or other process described above is executed, the motion of the control axis may delay from the motion of the operation axis operated by the user. However, such a delay is not a problem in direct teaching of the robot 2. This is because, in direct teaching of a robot in general, the user may hold and move the robot and then the robot is stopped, and in this state, the user may confirm whether the arm tip position and posture are as desired by the user. This series of actions is iterated to perform desired teaching. Specifically, in direct teaching of the robot 2, the user does not have to continue moving the robot 2, and there is necessarily a period in which the robot 2 is stopped.

In the control of the present embodiment, the motion of the control axis may be delayed from the motion of the operation axis. However, the delay can be recovered during the period in which the robot 2 is stopped. Accordingly, in direct teaching of the robot 2, the delay in motion of the control axis due to the control described above is not a problem. For the reasons described above, the present embodiment uses, on purpose, the control of allowing motion of the control delay. Thus, safety is ensured to be improved in the robot 2.

Third Embodiment

Referring to FIGS. 19, 20, 21A and 21B, a third embodiment of the present disclosure will be described. The third embodiment is different from the second embodiment in that the control performed by the controller 3, i.e., a method of controlling the robot 2, has been changed.

According to the second embodiment, an abrupt motion of the control axes can be avoided. However, a phenomenon in which axis displacement increases near a singular point of the robot 2 cannot be avoided. In other words, a phenomenon in which each axis moves at a joint angle that is greatly different from the command angle is unavoidable near a singular point. During direct teaching, the user operates the operation axes at a position near the robot 2. Therefore, in the occurrence of a phenomenon in which axis displacement increases near a singular point, the arm or the like of the robot 2 may contact the user, which may deteriorate safety.

Figure 19:
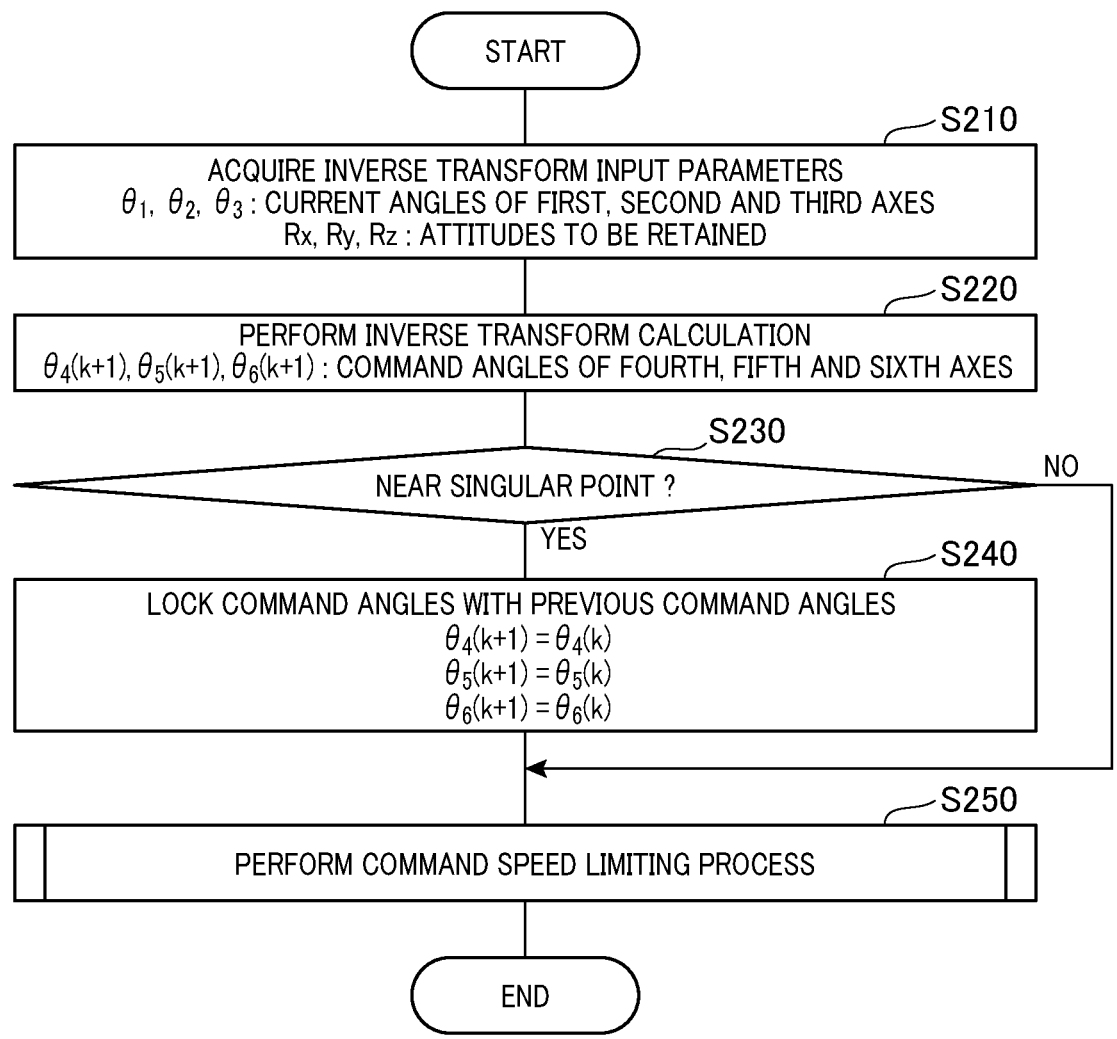
FIG. 19 is a flow diagram illustrating a first command calculation process, according to a third embodiment of the present disclosure.

In the present embodiment, to improve this issue, some modification has been made to the first and second command calculation processes which are executed by the controller 3 functioning as the angle control section. An example of the first command calculation process of the present embodiment is shown in FIG. 19. This first command calculation process is different from that of the second embodiment in that steps S230 and S240 have been added.

In this case, after executing step S220, control proceeds to step S230 where the controller 3 detects whether the robot 2 is positioned near a singular point. Being positioned near a singular point can be detected, for example, from each axis angle allowing Jacobian to become zero, or from the fifth axis being near zero degrees, or the like. If being positioned near a singular point is not detected, the determination made at step S230 will be "NO" and control proceeds to step S250 without executing step S240.

If being positioned near a singular point is detected, the determination made at step S230 will be "YES" and then control proceeds to step S240 where the controller 3 fixes (locks) the command angles of the current iteration to those of the previous iteration. In this case, the command angles $\theta_4(k+1)$, $\theta_5(k+1)$ and $\theta_6(k+1)$ of the current iteration are respectively replaced by the command angles $\theta_4(k)$, $\theta_5(k)$ and $\theta_6(k)$ of the previous iteration. After executing step S240, control proceeds to step S250.

Figure 20:
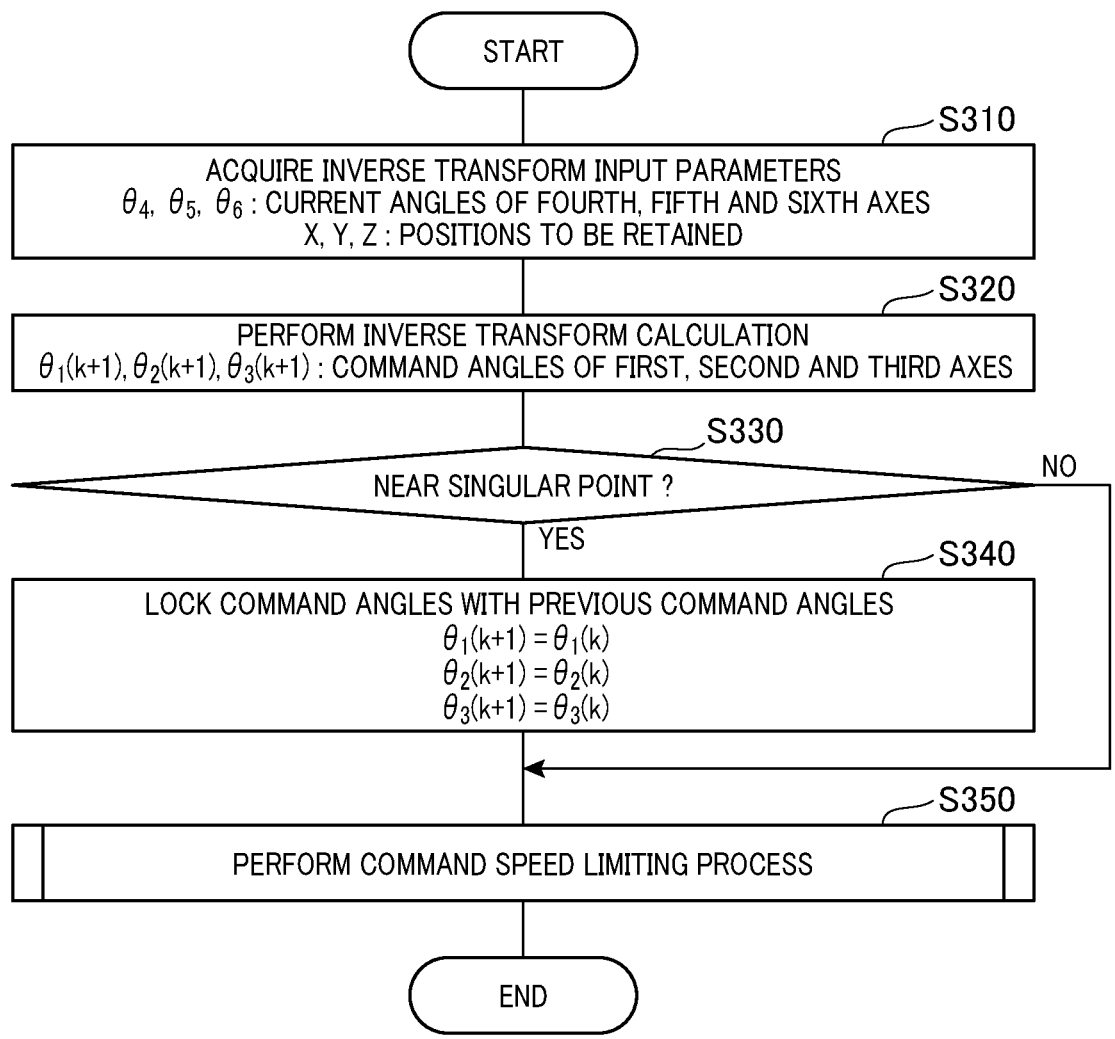
FIG. 20 is a flow diagram illustrating a second command calculation process, according to the third embodiment.

An example of the second command calculation process of the present embodiment is shown in FIG. 20. This second command calculation process is different from that of the second embodiment in that steps S330 and S340 have been added. In this case, after executing step S320, control proceeds to step S330 where the controller 3 detects whether the robot 2 is near a singular point. If being positioned near a singular point is not detected, the determination made at step S330 will be "NO" and control proceeds to step S350 without executing step S340.

If being positioned near a singular point is detected, the determination made at step S330 will be "YES" and then control proceeds to step S340 where the controller 3 fixes (locks) the command angles of the current iteration to those of the previous iteration. In this case, the command angles $\theta_1(k+1)$, $\theta_2(k+1)$ and $\theta_3(k+1)$ of the current iteration are respectively replaced by the command angles $\theta_1(k)$, $\theta_2(k)$ and $\theta_3(k)$ of the previous iteration. After executing step S340, control proceeds to step S350.

In the present embodiment, steps S230 and S330 each correspond to the singular point detection process in which the robot 2 detects whether each control axis is near a singular point. Furthermore, in the present embodiment, steps S240 and S340 each correspond to the command angle replacement process in which, if being positioned near a singular point has been detected in the singular point detection process, command angles from this time onward are replaced by the command angles of the previous iteration.

Figure 21A:
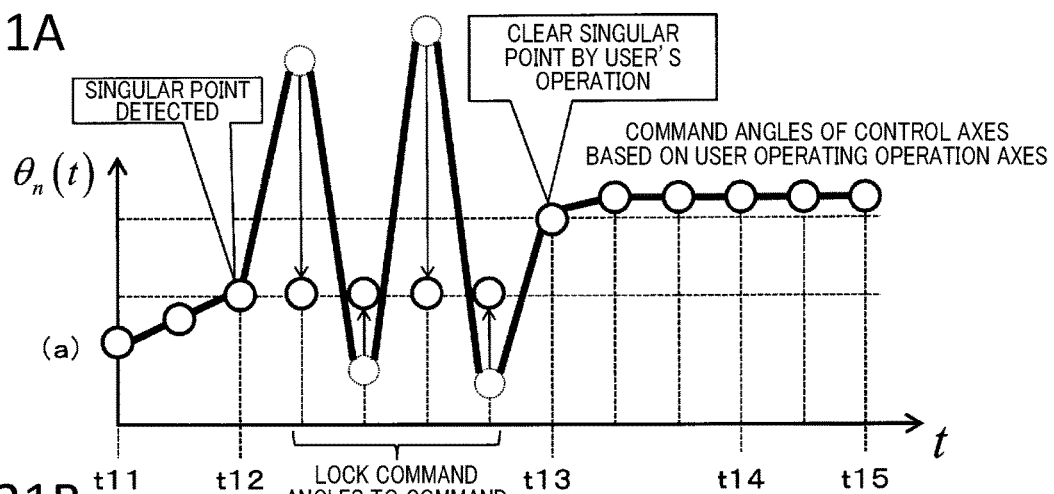
FIGS. 21A and 21B are diagrams each illustrating correction of a command value during direct teaching, according to the third embodiment.
Figure 21B:
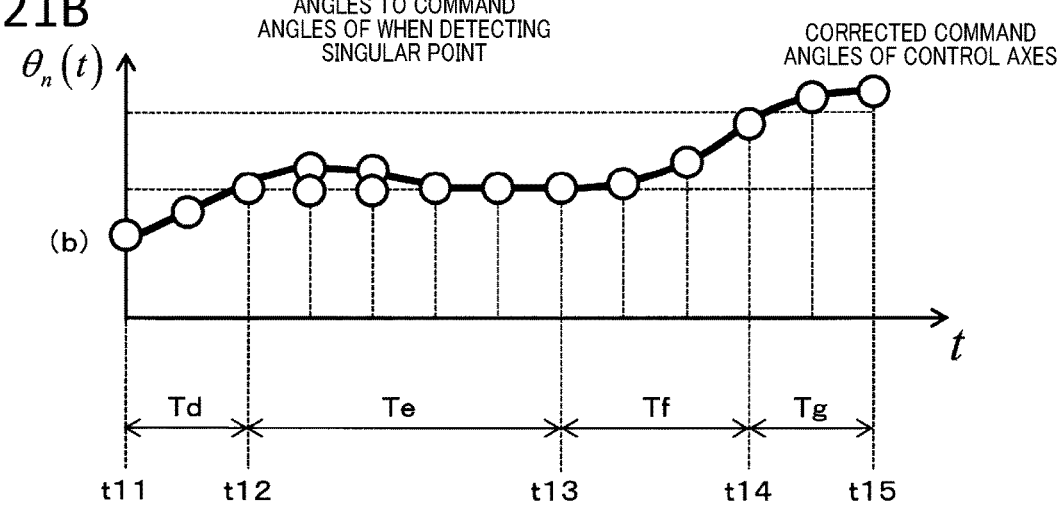

Referring to FIGS. 21A and 21B, the following description explains processing in which a command value (command angle $\theta_n(t)$) of each control axis near a singular point is corrected (interpolated). This processing is performed after execution of the singular point detection process, the command angle replacement process and the command speed limiting process. In FIGS. 21A and 21B, the period Td between times t11 and t12 is a normal period in which each control axis is not near a singular point, the period Te between times t12 and 513 is a period in which each control axis is near a singular point, the period Tf between times t13 and t14 is a period in which acceleration correction is being performed, and the period Tg between times t14 and t15 is a period in which deceleration correction is being performed.

It should be noted that FIG. 21A shows the case where neither of the singular point detection process and the command angle replacement process is executed, and FIG. 21B shows the case where both of these processes are executed. When the robot 2 positioning near a singular point has been detected at time t12, i.e., when a singular point has been detected, the command angle $\theta_n(t)$ from this time onward is fixed (locked), as shown in FIG. 21A, to the command angle at the time of detecting the singular point.

However, in this case, execution of the command speed limiting process allows the command angle to moderately vary, as shown in FIG. 21B, toward the command angle at the time of detecting the singular point. Since the command angle is locked during the period Te between times t12 and t13, retainment of the position and posture of the control axis by angle control is temporarily interrupted. In this case, for example, being positioned near a singular point and being interrupted in retainment of the position and posture may be notified to the user by presenting a message accordingly on a display device of the teaching pendant or the like, or by changing lighting or color of LEDs provided to the housing or the like of the robot 2. In this way, the user can be correctly aware of the current conditions of the robot 2.

At time t13 following the robot 2 clearing the singular point by the user's operation, the acceleration correction process and the deceleration correction process are performed in the period between times t13 and t15. As a result, the command angle is corrected such that the angular velocity of the control axis is reduced. As shown in FIG. 21B, when the singular point detection process and the command angle replacement process are executed, the robot may have a behavior in which the command angle $\theta_n(t)$ varies being delayed from the case in which neither of these processes are executed (see FIG. 21A)

As described above, when the robot 2 is positioned near a singular point, the controller 3 of the present embodiment is ensured to execute a process in which the command angles from this time onward are fixed to the command angles of the previous iteration (the command angles at the time of detecting the singular point). This may minimize the occurrence of a phenomenon in which axis displacement of the robot 2 increases near a singular point, and accordingly may improve safety.

In this case, retainment in position and posture of the control axes by angle control is temporarily interrupted. However, if the control axes can clear the singular point according to the operation of the operation axes, retainment in position and posture of the control axes by angle control is resumed thereafter.

As described above, when the robot 2 is positioned near a singular point, the process of locking the command angles to the previous command angles is executed to temporarily interrupt retainment in position and posture of the control axes by angle control. Thus, delay in motion of the control axes due to the acceleration correction process or other processes can be recovered. Specifically, according to the present embodiment, delay in motion of the control axes due to the acceleration correction process or other processes can be recovered, while safety of the robot 2 at the position near the singular point can be improved.

Other Embodiments

The present disclosure should not be construed as being limited to the embodiments described above by referring to the drawings but may be modified, combined or extended as desired within the range not departing from the spirit of the present disclosure.

The numerical values presented in the above embodiments are only examples. Numerical values should not be limited to those presented above.

Application of the present disclosure is not limited the application to the robot system 1 that is a generally used industrial robot system. The present disclosure may be applied to control of vertical articulated robots and robot control in general suitable for direct teaching.

The controller 3 may be arranged outside the base 4 of the robot 2.

Tip side axes are not limited to the fourth, fifth and sixth axes, but may, for example, be axes, such as the third, fourth and sixth axes, which can be dominant factors when determining the posture of the arm tip. Also, the base side axes are not limited to the first, second and third axes, but may, for example, be axes, such as the first, second and fifth axes, which can be dominant factors when determining the position of the arm tip. Grouping into the tip side axes and the base side axes may be appropriately changed according to the specification of the robot to be controlled.

What is claimed is:

1. A robot control apparatus that controls a vertical articulated robot and is suitable for direct teaching in which a user directly moves the robot to teach a position and posture of an arm tip of the robot, the apparatus comprising:
  a processor programmed to function as:
    an angle control section that performs angle control of axes of the robot; and
    an axis setting section that sets operation axes and control axes from among the axes subjected to the angle control, when performing the direct teaching of changing a position of the arm tip, while retaining a posture of the arm tip at a target posture, the operation axes (i) being dominant in determining the position of the arm tip and (ii) being allowed to freely move according to an external force, the control axes (i) being dominant in determining the posture of the arm tip and (ii) being controlled by the angle control section, wherein
  when performing the direct teaching, the angle control section receives an input of current angles of the operation axes and the target posture to calculate command angles of the respective control axes according to inverse kinematics calculation.

2. The robot control apparatus according to claim 1, wherein the angle control section performs an acceleration correction process in which, when a command angle is calculated for each of the control axes, the command angle is corrected such that a command angular velocity and a command angular acceleration of each of the control axes calculated based on the command angle do not respectively exceed a predetermined maximum angular velocity and a predetermined maximum angular acceleration.

3. The robot control apparatus according to claim 2, wherein the angle control section performs:
  a singular point detection process in which it is detected whether the robot is positioned near a singular point; and
  a command angle replacement process in which, when the robot is detected to be at a position near the singular point as a result of the singular point detection process, the command angles from this time onward are respectively replaced by command angles of the previous iteration.

4. The robot control apparatus according to claim 1, wherein the angle control section performs:
  a singular point detection process in which it is detected whether the robot is positioned near a singular point; and
  a command angle replacement process in which, when the robot is detected to be at a position near the singular point as a result of the singular point detection process, the command angles from this time onward are respectively replaced by command angles of the previous iteration.

5. A robot control apparatus that controls a vertical articulated robot and is suitable for direct teaching in which a user directly moves the robot to teach a position and posture of an arm tip of the robot, the apparatus comprising:
 a processor programmed to function as:
  an angle control section that performs angle control of axes of the robot; and
  an axis setting section that sets operation axes and control axes from among the axes subjected to the angle control, when performing the direct teaching of changing a posture of the arm tip, while retaining a position of the arm tip at a target position, the operation axes (i) being dominant in determining the posture of the arm tip and (ii) being allowed to freely move according to an external force, the control axes (i) being dominant in determining the position of the arm tip and (ii) being controlled by the angle control section, wherein
 when performing the direct teaching, the angle control section receives an input of current angles of the operation axes and the target position to calculate command angles of the respective control axes according to inverse kinematics calculation.

6. The robot control apparatus according to claim 5, wherein the angle control section performs an acceleration correction process in which, when a command angle is calculated for each of the control axes, the command angle is corrected such that a command angular velocity and a command angular acceleration of each of the control axes calculated based on the command angle do not respectively exceed a predetermined maximum angular velocity and a predetermined maximum angular acceleration.

7. The robot control apparatus according to claim 6, wherein the angle control section performs:
 a singular point detection process in which it is detected whether the robot is positioned near a singular point; and
 a command angle replacement process in which, when the robot is detected to be at a position near the singular point as a result of the singular point detection process, the command angles from this time onward are respectively replaced by command angles of the previous iteration.

8. The robot control apparatus according to claim 5, wherein the angle control section performs:
 a singular point detection process in which it is detected whether the robot is positioned near a singular point; and
 a command angle replacement process in which, when the robot is detected to be at a position near the singular point as a result of the singular point detection process, the command angles from this time onward are respectively replaced by command angles of the previous iteration.

9. A robot control method used for controlling a vertical articulated robot and for performing direct teaching in which a user directly moves the robot to teach a position and posture of an arm tip of the robot, comprising:
 performing an angle control process that performs angle control of axes of the robot; and
 performing an axis setting process that sets operation axes and control axes from among the axes subjected to the angle control, when performing the direct teaching of changing a position of the arm tip, while retaining a posture of the arm tip at a target posture, the operation axes (i) being dominant in determining the position of the arm tip and (ii) being allowed to freely move according to an external force, the control axes (i) being dominant in determining the posture of the arm tip and (ii) being controlled by the angle control section, wherein
 in the angle control process, when performing the direct teaching, the angle control section receives an input of current angles of the operation axes and the target posture to calculate command angles of the respective control axes according to inverse kinematics calculation.

10. The robot control method according to claim 9, wherein the angle control process includes an acceleration correction process in which, when a command angle is calculated for each of the control axes, the command angle is corrected such that a command angular velocity and a command angular acceleration of each of the control axes calculated based on the command angle do not respectively exceed a predetermined maximum angular velocity and a predetermined maximum angular acceleration.

11. The robot control apparatus according to claim 10, wherein the angle control process includes:
 a singular point detection process in which it is detected whether the robot is positioned near a singular point; and
 a command angle replacement process in which, when the robot is detected to be at a position near the singular point as a result of the singular point detection process, the command angles from this time onward are respectively replaced by command angles of the previous iteration.

12. A robot control method used for controlling a vertical articulated robot and for performing direct teaching in which a user directly moves the robot to teach a position and posture of an arm tip of the robot, comprising:
 performing an angle control process that performs angle control of axes of the robot; and
 performing an axis setting process that sets operation axes and control axes from among the axes subjected to the angle control, when performing the direct teaching of changing a posture of the arm tip, while retaining a position of the arm tip at a target position, the operation axes (i) being dominant in determining the posture of the arm tip and (ii) being allowed to freely move according to an external force, the control axes (i) being dominant in determining the position of the arm tip and (ii) being controlled by the angle control section, wherein
 in the angle control process, when performing the direct teaching, the angle control section receives an input of current angles of the operation axes and the target position to calculate command angles of the respective control axes according to inverse kinematics calculation.

13. The robot control method according to claim 12, wherein the angle control process includes an acceleration correction process in which, when a command angle is calculated for each of the control axes, the command angle is corrected such that a command angular velocity and a command angular acceleration of each of the control axes calculated based on the command angle do not respectively exceed a predetermined maximum angular velocity and a predetermined maximum angular acceleration.

14. The robot control apparatus according to claim 13, wherein the angle control process includes:
 a singular point detection process in which it is detected whether the robot is positioned near a singular point; and a command angle replacement process in which, when the robot is detected to be at a position near the singular point as a result of the singular point detection process, the command angles from this time onward are respectively replaced by command angles of the previous iteration.

* * * * *